(12) United States Patent
Xiao et al.

(10) Patent No.: US 9,829,563 B2
(45) Date of Patent: Nov. 28, 2017

(54) POSITIONING METHOD AND APPARATUS

(71) Applicant: HUAWEI TECHNOLOGIES CO., LTD., Shenzhen (CN)

(72) Inventors: Dengkun Xiao, Beijing (CN); Jie Cui, Tokyo (JP); Yongtong Wu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 336 days.

(21) Appl. No.: 14/677,149

(22) Filed: Apr. 2, 2015

(65) Prior Publication Data
US 2015/0219750 A1 Aug. 6, 2015

Related U.S. Application Data

(63) Continuation of application No. PCT/CN2012/082795, filed on Oct. 11, 2012.

(30) Foreign Application Priority Data

Oct. 8, 2012 (WO) ................ PCT/CN2012/082563

(51) Int. Cl.
*G01S 3/02* (2006.01)
*G01S 5/14* (2006.01)
(Continued)

(52) U.S. Cl.
CPC .............. *G01S 5/14* (2013.01); *G01S 5/0215* (2013.01); *H04W 64/00* (2013.01)

(58) Field of Classification Search
CPC ............ G01S 3/02; G01S 5/14; G01S 5/0215; H04W 64/00
(Continued)

(56) References Cited

U.S. PATENT DOCUMENTS

2004/0119641 A1 6/2004 Rapeli
2004/0127228 A1 7/2004 You et al.
(Continued)

FOREIGN PATENT DOCUMENTS

CN 1337133 2/2002
CN 101883427 A 11/2010
(Continued)

OTHER PUBLICATIONS

Chinese Office Action dated Mar. 1, 2016 in corresponding Chinese Patent Application No. 201280076021.0.
(Continued)

*Primary Examiner* — Harry Liu
(74) *Attorney, Agent, or Firm* — Staas & Halsey LLP

(57) ABSTRACT

Embodiments of the present invention provide a positioning method, including: determining, by a positioning server, positioning signal configuration information; sending, by the positioning server, the positioning signal configuration information to a positioning signal sending entity; obtaining, by the positioning server, a measurement estimation result of a shortest transmission path between a positioning signal measurement entity and the positioning signal sending entity; and positioning, by the positioning server, a terminal by using the measurement estimation result of the shortest transmission path, where the terminal is one of the positioning signal measurement entity and the positioning signal sending entity. The embodiments of the present invention can resist an NLOS path deviation and a positioning signal strength loss and an SINR loss, so as to improve the positioning accuracy.

20 Claims, 19 Drawing Sheets

(51) Int. Cl.
   *H04W 64/00*   (2009.01)
   *G01S 5/02*    (2010.01)

(58) Field of Classification Search
   USPC ........................................................ 342/451
   See application file for complete search history.

(56) References Cited

U.S. PATENT DOCUMENTS

| | | | |
|---|---|---|---|
| 2005/0078033 A1* | 4/2005 | Tamaki | G01S 5/0252 342/463 |
| 2009/0216447 A1* | 8/2009 | Uchida | G01S 19/05 701/469 |
| 2010/0225541 A1 | 9/2010 | Hertzog et al. | |
| 2011/0081933 A1 | 4/2011 | Suh et al. | |
| 2011/0143771 A1 | 6/2011 | Edge et al. | |
| 2011/0212733 A1 | 9/2011 | Edge et al. | |
| 2013/0039342 A1* | 2/2013 | Kazmi | H04W 48/16 370/331 |
| 2013/0040664 A1 | 2/2013 | Zhang et al. | |

FOREIGN PATENT DOCUMENTS

| | | |
|---|---|---|
| CN | 101931857 | 12/2010 |
| CN | 102014486 A | 4/2011 |
| EP | 1 377 093 A1 | 1/2004 |
| EP | 1 793 643 A2 | 6/2007 |

OTHER PUBLICATIONS

Yingmin et al., "TD-LTE-Advanced Mobile Communication System Design", "China's Twelfth Five-Year Plan" For National Key Books Publishing Planning Project 4G: Series: TD-LTE-Advanced Mobile Communications System Design, Posts and Telecom Press, Feb. 1, 2012, Beijing, China, 15 pages.

PCT International Search Report dated Jul. 11, 2013 in corresponding International Patent Application No. PCT/CN2012/082795.

"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321, V11.0.0, Sep. 2012, pp. 1-55.

"3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331, V11.1.0, Sep. 2012, pp. 1-325.

"3rd Generation Partnership Project; Technical Specification Group Radio Access Network; Evolved Universal Terrestrial Radio Access (E-UTRA); LTE Positioning Protocol (LPP) (Release 11)", 3GPP TS 36.355, V11.0.0, Sep. 2012, pp. 1-117.

"3rd Generation Partnership Project; Technical Specification Group Radio Access Network; Evolved Universal Terrestrial Radio Access (E-UTRA); LTE Positioning Protocol A (LPPa) (Release 11)", 3GPP TS 36.455, V11.0.0, Sep. 2012, pp. 1-52.

International Search Report dated Jul. 11, 2013 in corresponding international application PCT/CN2012/082795.

* cited by examiner

POSITIONING METHOD AND APPARATUS

CROSS-REFERENCE TO RELATED APPLICATIONS

This application is a continuation of International Application No. PCT/CN2012/082795, filed on Oct. 11, 2012, which claims priority to International Application No. PCT/CN2012/082563, filed on Oct. 8, 2012, both of which are hereby incorporated by reference in their entireties.

TECHNICAL FIELD

The present invention relates to the wireless communications field, and in particular, to a positioning method and apparatus.

BACKGROUND

In cellular mobile communications, cell identity (CID) positioning, also referred to as cell of origin (COO) positioning or cell global identity (CGI) positioning, is a commonly used positioning method that is easy to implement. The basic principle of a CID positioning algorithm is representing a geographical location of a terminal according to an identifier of a cell in which the terminal is located. A positioning server may learn about, according to an identifier of a cell in a cellular network, a base station corresponding to the cell and geographical information of the base station. In the CID positioning method, a CGI is generally used as a unique identifier for identifying a cell.

An enhanced CID (e-CID) positioning method is an enhanced positioning method of the conventional CID positioning method. In the eCID positioning method, based on the CID positioning method, estimation of an angle of arrival (AoA), estimation of a receiving and sending time difference (Rx–Tx time difference) of a terminal, or the like is added.

An observed time difference of arrival (OTDOA) positioning method is also a common positioning technology. The principle of the OTDOA positioning method is that: In a system that has at least three positioning base stations, a location of a terminal may be determined according to time differences of arrival between downlink positioning signals of different positioning base stations. The downlink positioning signals may be reference signals or synchronization signals. A positioning server requests a positioning base station to report a sending configuration of a positioning reference signal (PRS) (herein, it refers to a positioning signal) of the positioning base station, and notifies, in a form of assistance data, the terminal of the sending configuration, and then, the terminal receives PRSs from multiple positioning base stations according to the assistance data and identifies an arrival moment of each PRS on a first arrival path, so that the terminal can obtain time differences of arrival between PRSs from the different positioning base stations, and report the time differences of arrival to the positioning server. The positioning server receives the time differences between the signals from the different positioning base stations through the terminal, and may map the time differences to differences between distances from the terminal to the different positioning base stations, and perform mathematical calculation according to the differences between distances from the terminal to the different positioning base stations and by using a hyperbolic model, so that the positioning server can obtain an accurate location of the terminal.

However, in the prior art, positioning accuracy still needs to be improved in some scenarios.

SUMMARY

In view of this, a positioning method and apparatus are provided, so as to improve the positioning accuracy.

A first aspect provides a positioning method, where the method includes:
  determining, by a positioning server, positioning signal configuration information;
  sending, by the positioning server, the positioning signal configuration information to a positioning signal sending entity;
  obtaining, by the positioning server, a measurement estimation result of a shortest transmission path between a positioning signal measurement entity and the positioning signal sending entity; and
  positioning, by the positioning server, a terminal by using the measurement estimation result of the shortest transmission path, where the terminal is one of the positioning signal measurement entity and the positioning signal sending entity.

A second aspect provides a positioning method, where the method includes:
  obtaining, by a positioning signal sending entity, positioning signal configuration information; and
  sending, by the positioning signal sending entity, a corresponding positioning signal to the positioning signal measurement entity according to the positioning signal configuration information, so that, after the positioning signal measurement entity measures the positioning signal, a positioning server obtains a measurement estimation result of a shortest transmission path between the positioning signal measurement entity and the positioning signal sending entity, and the positioning server positions a terminal by using the measurement estimation result of the shortest transmission path, where the terminal is one of the positioning signal measurement entity and the positioning signal sending entity.

A third aspect provides a positioning method, where the method includes:
  receiving, by a positioning signal measurement entity, positioning signal configuration information sent by a positioning server;
  receiving, by the positioning signal measurement entity, positioning signals according to the positioning signal configuration information, and measuring the positioning signals to obtain multiple measurement results of the positioning signals between the positioning signal measurement entity and a positioning signal sending entity; and
  sending, by the positioning signal measurement entity, multiple measurement estimation results corresponding to the multiple measurement results to the positioning server, so that the positioning server determines a shortest transmission path between the positioning signal measurement entity and the positioning signal sending entity according to the multiple measurement estimation results, and positions a terminal by using a measurement estimation result corresponding to the shortest transmission path in the multiple measurement estimation results; or determining, by the positioning signal measurement entity, a measurement estimation result of a shortest transmission path between the positioning signal measurement entity and the positioning signal sending entity in multiple measurement estimation results corresponding to the multiple measurement results, and sending the measurement estimation result corresponding to the shortest transmission path to the positioning server, so that the positioning server positions a terminal by using the measurement estimation result of the shortest transmission path, where the terminal is one of the positioning signal measurement entity and the positioning signal sending entity, and the measurement estimation result is the measurement result or an estimation result derived according to the measurement result.

A fourth aspect provides a positioning method, where the method includes:

receiving, by a positioning server, positioning signal configuration reference information sent by a terminal, a serving base station of the terminal, or a mobility management device to which the terminal belongs, where the positioning signal configuration reference information includes one or more of the following: environment information, radio channel propagation information, and positioning signal configuration demand information of the terminal;

determining, by the positioning server, positioning signal configuration information according to the positioning signal configuration reference information, where the positioning signal configuration information includes transmit power configuration information and/or resource configuration information of a positioning signal, and the resource configuration information includes time domain and/or frequency domain resource configuration information;

sending, by the positioning server, the positioning signal configuration information to a positioning signal sending entity, so that the positioning signal sending entity sends a positioning signal according to the positioning signal configuration information, where the positioning signal is a positioning signal with positioning signal transmit power increased and/or resources added according to the positioning signal configuration information, and the resources include time domain and/or frequency domain resources; and obtaining, by the positioning server, a measurement estimation result of the positioning signal that is reported by a positioning signal measurement entity, and positioning the terminal by using the measurement estimation result, where the terminal is one of the positioning signal measurement entity and the positioning signal sending entity.

A fifth aspect provides a positioning signal sending method, where the method includes:

receiving, by a positioning signal sending entity, the positioning signal configuration information, where the positioning signal configuration information includes transmit power configuration information and/or resource configuration information of a positioning signal, and the resource configuration information includes time domain and/or frequency domain resource configuration information; and sending, by the positioning signal sending entity, a positioning signal according to the positioning signal configuration information, so that the positioning signal measurement entity measures the positioning signal and reports a measurement estimation result to a positioning server, and further, the positioning server positions a terminal according to the measurement estimation result, where the positioning signal is a positioning signal with positioning signal transmit power increased and/or resources added according to the positioning signal configuration information, and the resources include time domain and/or frequency domain resources.

A sixth aspect provides a positioning server is provided, where the positioning server includes:

a receiving module;

a control module, configured to determine positioning signal configuration information, and obtain a measurement estimation result of a shortest transmission path between a positioning signal measurement entity and the positioning signal sending entity;

a sending module, configured to send the positioning signal configuration information determined by the control module to the positioning signal sending entity; and a positioning module, configured to position a terminal by using the measurement estimation result of the shortest transmission path that is obtained by the control module, where the terminal is one of the positioning signal measurement entity and the positioning signal sending entity.

A seventh aspect provides a positioning signal sending entity, where the positioning signal sending entity includes:

a receiving module;

an obtaining module, configured to obtain positioning signal configuration information; and a sending module, configured to send a corresponding positioning signal to the positioning signal measurement entity according to the positioning signal configuration information obtained by the obtaining module, so that, after the positioning signal measurement entity measures the positioning signal, a positioning server obtains a measurement estimation result of a shortest transmission path between the positioning signal measurement entity and the positioning signal sending entity, and the positioning server positions a terminal by using the measurement estimation result of the shortest transmission path, where the terminal is one of the positioning signal measurement entity and the positioning signal sending entity.

An eighth aspect provides a positioning signal measurement entity is provided, where the positioning signal measurement entity includes:

a receiving module, configured to receive positioning signal configuration information sent by a positioning server, and receive positioning signals according to the positioning signal configuration information; and a control module, configured to measure the positioning signals received by the receiving module, to obtain multiple measurement results of the positioning signals between the positioning signal measurement entity and a positioning signal sending entity, and obtain measurement estimation results of the multiple measurement results; and a sending module, configured to send multiple measurement estimation results obtained by the control module to the positioning server, so that the positioning server determines a measurement estimation result of a shortest transmission path between the positioning signal measurement entity and the positioning signal sending entity according to the multiple measurement results, and positions a terminal by using the measurement estimation result of the shortest transmission path; or a control module, configured to measure the positioning signals received by the receiving module, to obtain multiple measurement results of the positioning signals between the positioning signal measurement entity and a positioning signal sending entity, and determine a measurement estimation result of a shortest transmission path between the positioning signal measurement entity and the positioning signal sending entity in multiple measurement estimation results corresponding to the multiple measurement results; and a sending module, configured to send the measurement estimation result of the shortest transmission path that is determined by the control module to the positioning server, so that the positioning server positions a terminal by using the measurement estimation result of the shortest transmission path, where the terminal is one of the positioning signal measurement entity and the positioning signal sending entity, and the measurement estimation result is the measurement result or an estimation result derived according to the measurement result.

A ninth aspect provides a positioning server, where the positioning server includes:

a receiving module, configured to receive positioning signal configuration reference information sent by a terminal, a serving base station of the terminal, or a mobility management device to which the terminal belongs, and obtain a measurement estimation result of a positioning signal that is reported by a positioning signal measurement entity, where the positioning signal configuration reference information includes one or more of the following: environment information, radio channel propagation information, and positioning signal configuration demand information of the terminal;

a control module, configured to determine positioning signal configuration information according to the positioning signal configuration reference information received by the receiving module, and position the terminal by using the measurement estimation result obtained by the receiving module, where the positioning signal configuration information includes transmit power configuration information and/or resource configuration information of a positioning signal, and the resource configuration information includes time domain and/or frequency domain resource configuration information; and a sending module, configured to send the positioning signal configuration information to a positioning signal sending entity, so that the positioning signal sending entity sends the positioning signal according to the positioning signal configuration information, where the positioning signal is a positioning signal with positioning signal transmit power increased and/or resources added according to the positioning signal configuration information, the resources include time domain and/or frequency domain resources, and the terminal is one of the positioning signal measurement entity and the positioning signal sending entity.

A tenth aspect provides a positioning signal sending entity, where the positioning signal sending entity includes:

a sending module;

a receiving module, configured to receive the positioning signal configuration information, where the positioning signal configuration information includes transmit power configuration information and/or resource configuration information of a positioning signal, and the resource configuration information includes time domain and/or frequency domain resource configuration information; and a control module, configured to control, according to the positioning signal configuration information received by the receiving module, the sending module to send a positioning signal, so that the positioning signal measurement entity measures the positioning signal and reports a measurement result to a positioning server, and further, the positioning server positions a terminal according to the measurement result, where the positioning signal is a positioning signal with positioning signal transmit power increased and/or resources added according to the positioning signal configuration information, the resources include time domain and/or frequency domain resources, and the terminal is one of the positioning signal measurement entity and the positioning signal sending entity.

An eleventh aspect provides a positioning server, where the positioning server includes a memory, a transceiver, and a processor, where the memory is configured to store program code; and the processor is coupled with the memory, and is configured to invoke the program code stored in the memory to perform the following operations:

determining positioning signal configuration information;

sending the positioning signal configuration information to a positioning signal sending entity by using the transceiver;

obtaining a measurement estimation result of a shortest transmission path between a positioning signal measurement entity and the positioning signal sending entity; and positioning a terminal by using the measurement estimation result of the shortest transmission path, where the terminal is one of the positioning signal measurement entity and the positioning signal sending entity.

A twelfth aspect provides a positioning signal sending entity, where the positioning signal sending entity includes a transceiver, a processor, and a memory, where the memory is configured to store a set of program code; and the processor is coupled with the memory, and is configured to invoke the program code stored in the memory to perform the following operations:

obtaining positioning signal configuration information; and sending a corresponding positioning signal to the positioning signal measurement entity by using the transceiver according to the positioning signal configuration information, so that, after the positioning signal measurement entity measures the positioning signal, a positioning server obtains a measurement estimation result of a shortest transmission path between the positioning signal measurement entity and the positioning signal sending entity, and the positioning server positions a terminal by using the measurement estimation result of the shortest transmission path, where the terminal is one of the positioning signal measurement entity and the positioning signal sending entity.

A thirteenth aspect provides a positioning signal measurement entity, where the positioning signal measurement entity includes a transceiver, a processor, and a memory, where the memory is configured to store a set of program code; and the processor is coupled with the memory, and invokes the program code stored in the memory to perform the following operations:

receiving, by using the transceiver, positioning signal configuration information sent by a positioning server;

receiving positioning signals by using the transceiver according to the positioning signal configuration information, and measuring the positioning signals to obtain multiple measurement results of the positioning signals between the positioning signal measurement entity and a positioning signal sending entity; and sending, by using the transceiver, multiple measurement estimation results corresponding to the multiple measurement results to the positioning server, so that the positioning server determines a shortest transmission path between the positioning signal measurement entity and the positioning signal sending entity according to the multiple measurement estimation results, and positions a terminal by using a measurement estimation result corresponding to the shortest transmission path in the multiple measurement estimation results; or determining a measurement estimation result of a shortest transmission path between the positioning signal measurement entity and the positioning signal sending entity in multiple measurement estimation results corresponding to the multiple measurement results, and sending the measurement estimation result corresponding to the shortest transmission path to the positioning server, so that the positioning server positions a terminal by using the measurement estimation result of the shortest transmission path, where the terminal is one of the positioning signal measurement entity and the positioning signal sending entity, and the measurement estimation result is the measurement result or an estimation result derived according to the measurement result.

According to a fourteenth aspect, a positioning server is provided, where the positioning server includes a transceiver, a memory, and a processor, where the memory is configured to store a set of program code; and the processor is coupled with the memory, and invokes the program code stored in the memory to perform the following operations:

receiving, by using the transceiver, positioning signal configuration reference information sent by a terminal, a serving base station of the terminal, or a mobility management device to which the terminal belongs, where the positioning signal configuration reference information includes one or more of the following: environment information, radio channel propagation information, and positioning signal configuration demand information of the terminal;

determining positioning signal configuration information according to the positioning signal configuration reference information, where the positioning signal configuration information includes transmit power configuration information and/or resource configuration information of a positioning signal, and the resource configuration information includes time domain and/or frequency domain resource configuration information;

sending the positioning signal configuration information to a positioning signal sending entity by using the transceiver, so that the positioning signal sending entity sends a positioning signal according to the positioning signal configuration information, where the positioning signal is a positioning signal with positioning signal transmit power increased and/or resources added according to the positioning signal configuration information, and the resources include time domain and/or frequency domain resources; and obtaining, by using the transceiver, a measurement estimation result of the positioning signal that is reported by a positioning signal measurement entity, and positioning the terminal by using the measurement estimation result, where the terminal is one of the positioning signal measurement entity and the positioning signal sending entity.

According to a fifteenth aspect, a positioning signal sending entity is provided, where the positioning signal sending entity includes a transceiver, a memory, and a processor, where the memory is configured to store a set of program code; and the processor is coupled with the memory, and invokes the program code stored in the memory to perform the following operations:

receiving the positioning signal configuration information by using the transceiver, where the positioning signal configuration information includes transmit power configuration information and/or resource configuration information of a positioning signal, and the resource configuration information includes time domain and/or frequency domain resource configuration information; and sending a positioning signal by using the transceiver according to the positioning signal configuration information, so that the positioning signal measurement entity measures the positioning signal and reports a measurement estimation result to a positioning server, and further, the positioning server positions a terminal according to the measurement estimation result, where the positioning signal is a positioning signal with positioning signal transmit power increased and/or resources added according to the positioning signal configuration information, and the resources include time domain and/or frequency domain resources.

In the foregoing solutions, the terminal is positioned by using the measurement estimation result of the shortest transmission path, or power of the positioning signal is increased or a time domain and/or frequency domain resource of the positioning signal is added, so that a current factor greatly affecting the accuracy of a positioning method based on ToA estimation for an indoor environment or an outdoor environment can be reduced; therefore, the positioning accuracy is improved.

BRIEF DESCRIPTION OF DRAWINGS

To describe the technical solutions in the embodiments of the present invention more clearly, the following briefly introduces the accompanying drawings required for describing the prior art or the embodiments. Apparently, the accompanying drawings in the following description show merely some embodiments, and a person skilled in the art may still derive other drawings from these accompanying drawings.

DESCRIPTION OF EMBODIMENTS

To make the objectives, technical solutions, and advantages of embodiments of the present invention clearer, the following clearly describes the technical solutions in the embodiments of the present invention with reference to the accompanying drawings in the embodiments of the present invention. Apparently, the described embodiments are a part of the embodiments of the present invention rather than all of the embodiments. All other embodiments obtained by a person of ordinary skill in the art based on the embodiments of the present invention without creative efforts shall fall within the protection scope of the present invention.

Figure 1:
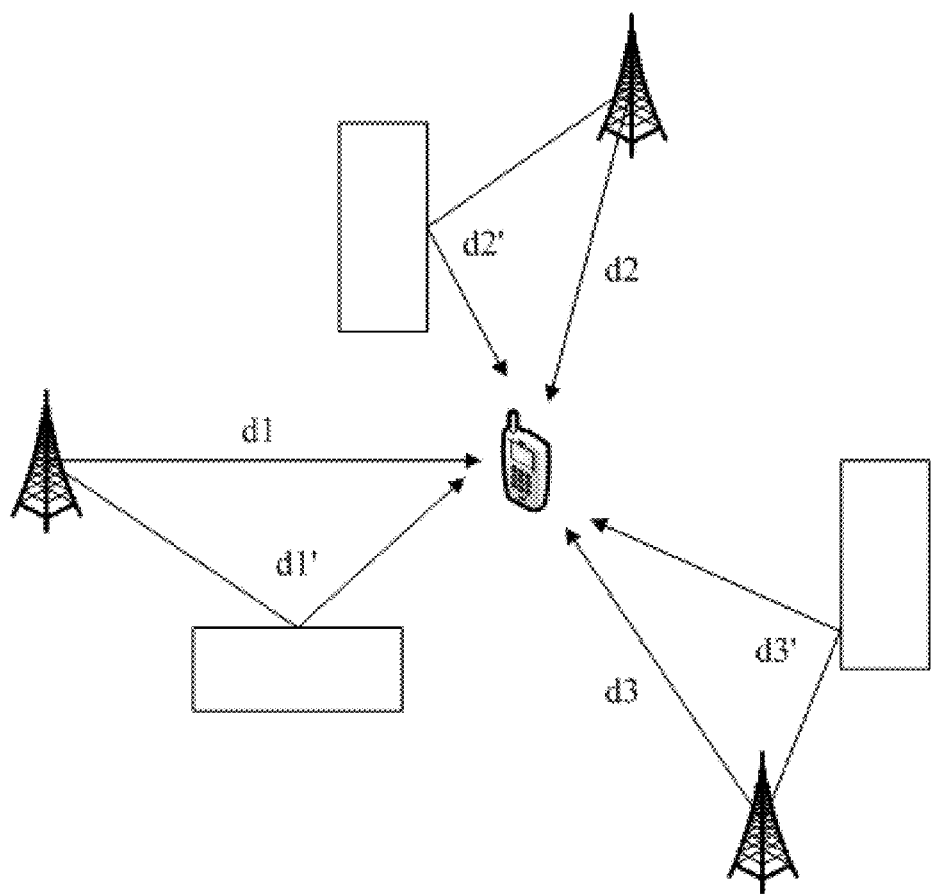
FIG. 1 is a schematic diagram of a radio propagation environment in the prior art.

Accuracy of an OTDOA positioning method depends largely on reception of a PRS and estimation of a first arrival path of a PRS, and a time difference of arrival (TDOA) between signals of any two positioning base stations in multiple positioning base stations needs to be estimated. In the prior art, the TDOA is generally calculated according to a first arrival path of a PRS sent from each positioning base station. However, a radio propagation environment in a dense urban area or an indoor radio propagation environment affects a transmission path of a signal, for example, as shown in FIG. 1, in an actual environment, due to a factor such as obstruction of a building, a signal sent by a positioning base station to a terminal does not arrive at the terminal in light of sight, but arrives at the terminal after a process such as reflection and/or refraction; therefore, a first arrival path actually used for positioning calculation is probably not light of sight (LOS) path; as a result, a TDOA cannot actually reflect a difference between light of sight distances between two base stations and the terminal, resulting in an increased positioning error. The light of sight described herein is a straight-line distance. For another example, in an indoor scenario, because a building has great impact on penetration of a signal, compared with an outdoor environment, an additional penetration loss needs to be considered for an indoor terminal, and this part of penetration loss reduces receive power of the signal or reduces a receive signal to interference plus noise ratio (signal to interference noise ratio, SINR); as a result, a measurement error of the terminal is increased or the number of positioning cells (positioning reference nodes) that can be detected by the terminal decreases, and finally, the positioning accuracy is affected.

Similarly, in an uplink positioning method, for example, an uplink time difference of arrival (UTDOA) positioning method, an uplink signal sent by a terminal also has a penetration loss when penetrating a building; as a result, receive power of a signal on a base station or location measurement unit (LMU) side is very low or an SINR is very low, and time of arrival (ToA) of the uplink signal cannot be accurately estimated; therefore, positioning is also greatly affected.

To sum up, the positioning accuracy in the prior art still needs to be improved. In addition, as analyzed above, current factors greatly affecting the accuracy of a positioning method based on ToA estimation in an indoor environment or an outdoor environment include: an NLOS path deviation, and a positioning signal strength loss and an SINR loss;

therefore, embodiments of the present invention provide a method for improving the positioning accuracy for the foregoing factors.

Considering the factors that affect the accuracy of the positioning method based on ToA estimation, the following embodiments provide positioning methods and apparatuses for different affecting factors, so as to improve the positioning accuracy in the prior art. It should be noted that, the embodiments of the present invention are applicable to an indoor environment and are also applicable to an outdoor environment.

For a case in which the positioning accuracy is affected by the NLOS path deviation, the following embodiments are provided.

Figure 2:
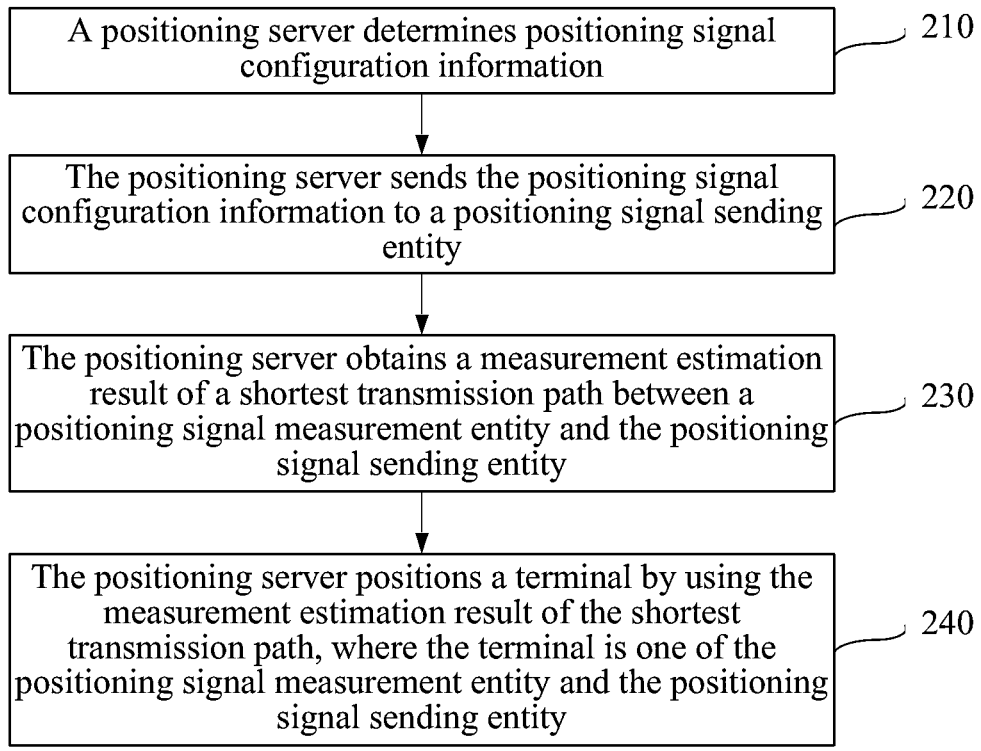
FIG. 2 is a flowchart of a positioning method according to an embodiment of the present invention.

An embodiment of the present invention provides a positioning method. As shown in FIG. 2, the method includes the following steps.

Step 210: A positioning server determines positioning signal configuration information.

Step 220: The positioning server sends the positioning signal configuration information to a positioning signal sending entity.

Step 230: The positioning server obtains a measurement estimation result of a shortest transmission path between a positioning signal measurement entity and the positioning signal sending entity.

Step 240: The positioning server positions a terminal by using the measurement estimation result of the shortest transmission path, where the terminal is one of the positioning signal measurement entity and the positioning signal sending entity.

In the foregoing embodiment, the positioning server positions the terminal by using the shortest transmission path; and because the shortest transmission path is closest to an LOS path, although paths through which a positioning signal measured by the positioning signal measurement entity pass may all be NLOS paths, in the solutions of this embodiment, the shortest transmission path can still be selected for positioning the terminal, so that a positioning error caused by the NLOS path deviation can be effectively controlled, and the positioning accuracy is effectively improved.

Figure 3:
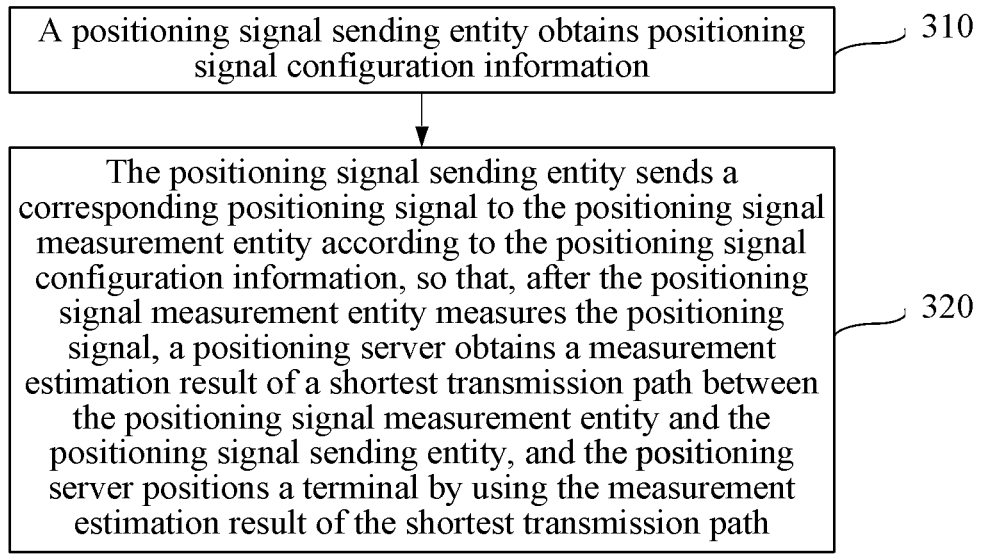
FIG. 3 is a flowchart of a positioning method according to another embodiment of the present invention.

Another embodiment of the present invention provides a positioning method. As shown in FIG. 3, the method includes the following steps.

Step 310: A positioning signal sending entity obtains positioning signal configuration information.

Step 320: The positioning signal sending entity sends a corresponding positioning signal to a positioning signal measurement entity according to the positioning signal configuration information, so that, after the positioning signal measurement entity measures the positioning signal, a positioning server obtains a measurement estimation result of a shortest transmission path between the positioning signal measurement entity and the positioning signal sending entity, and the positioning server positions a terminal by using the measurement estimation result of the shortest transmission path, where the terminal is one of the positioning signal measurement entity and the positioning signal sending entity.

In the foregoing embodiment, the positioning signal sending entity sends the positioning signal according to the obtained positioning signal configuration information, so that the positioning server positions the terminal by using the shortest transmission path; and because the shortest transmission path is closest to an LOS path, although paths through which the positioning signal measured by the positioning signal measurement entity pass may all be NLOS paths, in the solutions of this embodiment, the shortest transmission path can still be selected for positioning the terminal, so that a positioning error can be effectively controlled, and the positioning accuracy is effectively improved for the NLOS path deviation.

Figure 4:
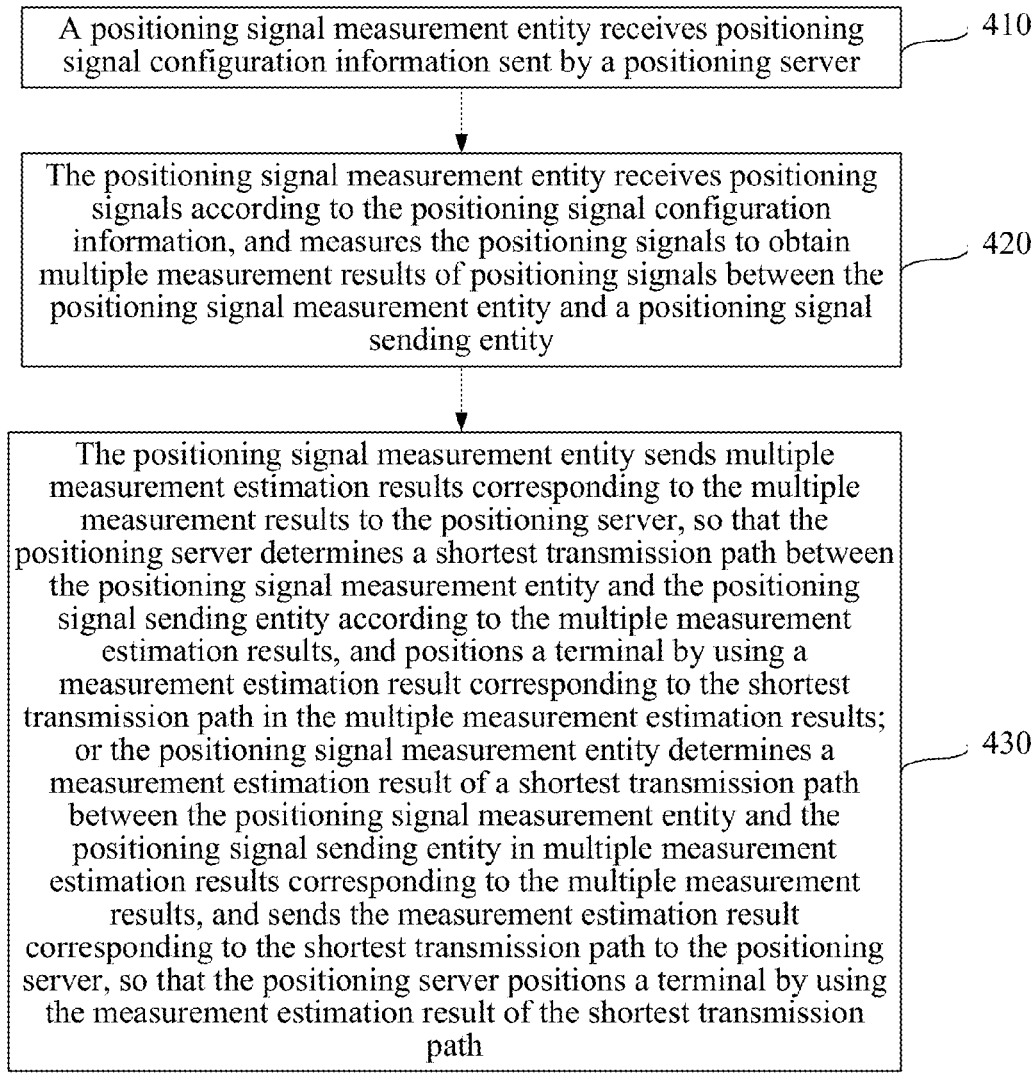
FIG. 4 is a flowchart of a positioning method according to another embodiment of the present invention.

Another embodiment of the present invention provides a positioning method. As shown in FIG. 4, the method includes the following steps.

Step 410: A positioning signal measurement entity receives positioning signal configuration information sent by a positioning server.

Step 420: The positioning signal measurement entity receives positioning signals according to the positioning signal configuration information, and measures the positioning signals to obtain multiple measurement results of the positioning signals between the positioning signal measurement entity and a positioning signal sending entity.

Step 430: The positioning signal measurement entity sends multiple measurement estimation results corresponding to the multiple measurement results to the positioning server, so that the positioning server determines a shortest transmission path between the positioning signal measurement entity and the positioning signal sending entity according to the multiple measurement estimation results, and positions a terminal by using a measurement estimation result corresponding to the shortest transmission path in the multiple measurement estimation results; or the positioning signal measurement entity determines a measurement estimation result of a shortest transmission path between the positioning signal measurement entity and the positioning signal sending entity in multiple measurement estimation results corresponding to the multiple measurement results, and sends the measurement estimation result corresponding to the shortest transmission path to the positioning server, so that the positioning server positions a terminal by using the measurement estimation result of the shortest transmission path.

The terminal is one of the positioning signal measurement entity and the positioning signal sending entity, and the measurement estimation result is the measurement result or an estimation result derived according to the measurement result.

In the foregoing embodiment, after measuring the positioning signals, the positioning signal measurement entity sends the multiple measurement estimation results to the positioning server, so that the positioning server positions the terminal by using the shortest transmission path, or the positioning signal measurement entity sends the measurement estimation result corresponding to the shortest transmission path to the positioning server, so that the positioning server positions the terminal by using the shortest transmission path; and because the shortest transmission path is closest to an LOS path, although paths through which the positioning signals measured by the positioning signal measurement entity pass may all be NLOS paths, in the solutions in this embodiment, the shortest transmission path can still be selected for positioning the terminal, so that a positioning error can be effectively controlled, and the positioning accuracy is effectively improved for the NLOS path deviation.

The foregoing embodiment is further described in the following.

Figure 5:
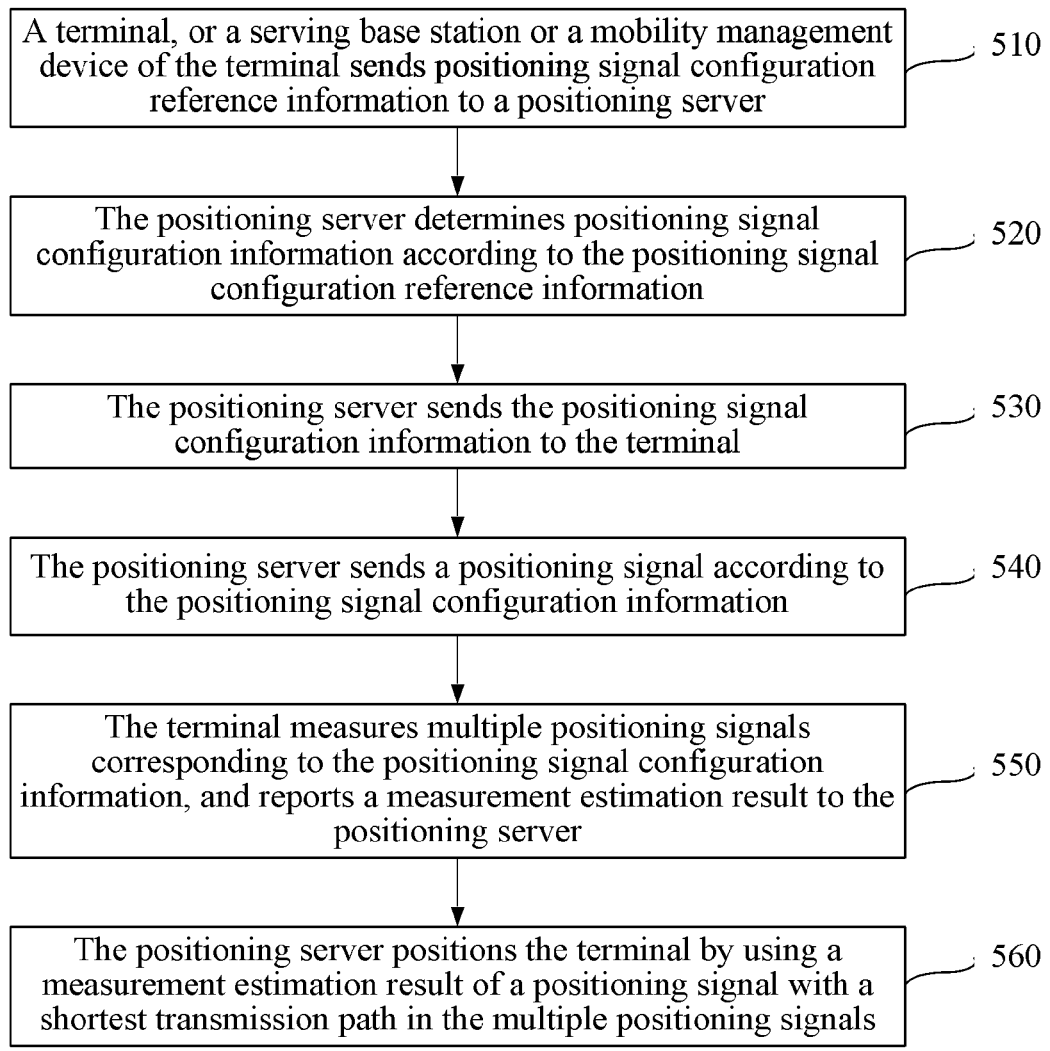
FIG. 5 is a flowchart of a positioning method according to another embodiment of the present invention.

Another embodiment of the present invention provides a positioning method. The positioning method shown in FIG. 5 is an improved OTDOA positioning method. In this embodiment, a positioning signal measurement entity is a terminal, and a positioning signal sending entity is a positioning base station. The method includes the following steps.

It should be noted that, the positioning signal measurement entity may also be a positioning base station, and the positioning signal sending entity may also be a terminal.

Step 510: A terminal, or a serving base station or a mobility management device of the terminal sends positioning signal configuration reference information to a positioning server, where the positioning signal configuration reference information includes one or more of the following: environment information, radio channel propagation information, and positioning signal configuration demand information of the terminal.

It should be noted that, this step is an optional step, and the positioning signal configuration reference information may be not sent to the positioning server; in this case, the positioning server may configure a positioning signal according to a preconfiguration.

In this step, if the positioning signal configuration reference information sent by the terminal to the positioning server includes the environment information, the environment information indicates an environment in which the terminal is located, for example, a dense urban area or an indoor environment; or the serving base station or the mobility management device of the terminal sends the positioning signal configuration reference information to the positioning server, where the environment information indicates an environment in which the serving base station is located or a determined environment in which the terminal is located. If the environment information indicates a dense urban area, the serving base station and the terminal are generally located in a same environment. After receiving the environment information, the positioning server can learn about a condition of a positioning signal that needs to be configured, so as to determine suitable positioning signal configuration information. For example, if the environment information indicates a dense urban area, after receiving the environment information, the positioning server determines that the suitable positioning signal configuration information is multicarrier and/or a multi-radio access technology (radio access technology, RAT), or the like.

The radio channel propagation information is propagation information of a radio channel of the terminal, and the radio channel propagation information may identify NLOS or LOS. Similarly, after receiving the radio channel propagation information, the positioning server can learn about the condition of the positioning signal that needs to be configured, so as to determine the suitable positioning signal configuration information.

The positioning signal configuration demand information may be a current demand indication of multicarrier positioning signals of the terminal, may also be a current demand indication of multi-RAT positioning signals of the terminal, and may further be any combination of the foregoing demand indications.

The mobility management device may vary in different systems, for example, may be a mobility management entity (mobilility management entity, MME) in an LTE system, or may be an SGSN in a UMTS system.

Step 520: The positioning server determines positioning signal configuration information according to the positioning signal configuration reference information.

Specifically, the positioning server determines a positioning base station and interacts with the positioning base station, and determines the positioning signal configuration information according to the positioning signal configuration reference information.

The positioning signal configuration information determined in this step corresponds to the positioning signal configuration reference information. For example, if the positioning signal configuration reference information is a demand indication that the terminal currently needs multicarrier positioning signals, the positioning signal configuration information indicates positioning signals of multiple carriers; and if the positioning signal configuration reference information is a demand indication that the terminal currently needs multi-RAT positioning signals, the positioning signal configuration information indicates positioning signals of multiple RATs. The positioning server may determine the positioning signal configuration reference information in various implementation manners.

In an implementation manner, after receiving the positioning signal configuration reference information, the positioning server obtains, from the positioning base station, a capability of the positioning base station that corresponds to the positioning signal configuration reference information, and determines the positioning signal configuration information according to the positioning signal configuration reference information and the capability of the positioning base station.

That the positioning signal configuration demand information is a demand indication that the terminal currently needs multicarrier positioning signals is used as an example for description. If the positioning signal configuration reference information received by the positioning server indicates that the terminal currently needs to transmit positioning signals on 3 carriers, the positioning server interacts with the positioning base station to obtain the number of carriers that is supported by the positioning base station. If the positioning base station supports 3 carriers, the positioning server determines that the positioning signal configuration information is positioning signals transmitted on the 3 carriers. If the positioning base station supports 5 carriers, the positioning server determines that the positioning signal configuration information is positioning signals transmitted on 3 carriers in the 5 carriers. If the positioning base station supports 2 carriers, the positioning server determines that the positioning signal configuration information is positioning signals transmitted on the 2 carriers.

For other demand information, the positioning server determines the positioning signal configuration information in a same manner, which is not described herein again.

In another implementation manner, after receiving the positioning signal configuration reference information, the positioning server sends the positioning signal configuration reference information to the positioning base station, and the positioning base station reconfigures sending of the positioning signal thereof according to the positioning signal configuration reference information and the capability of the positioning base station, and sends the positioning signal configuration information to the positioning server after completing the reconfiguration, so that the positioning server determines the positioning signal configuration information.

That the positioning signal configuration demand information is a demand indication that the terminal currently needs multicarrier positioning signals is used as an example for description. If the positioning signal configuration reference information received by the positioning server indicates that the terminal currently needs to transmit positioning signals on 3 carriers, the positioning server interacts with the positioning base station to configure the positioning base station to send the positioning signals on the 3 carriers. If the positioning base station supports 5 carriers, the positioning server determines that the positioning signal configuration information is positioning signals transmitted on 3 carriers in the 5 carriers. If the positioning base station supports 2 carriers, the positioning server determines that the positioning signal configuration information is positioning signals transmitted on the 2 carriers.

For other demand information, the positioning server determines the positioning signal configuration information in a same manner, which is not described herein again.

Step 530: The positioning server sends the positioning signal configuration information to the terminal.

Step 540: The positioning server sends positioning signals according to the positioning signal configuration information.

Step 550: The terminal measures multiple positioning signals corresponding to the positioning signal configuration information, and reports measurement estimation results to the positioning server.

In this step, the terminal measures the multiple positioning signals corresponding to the positioning signal configuration information, and if the positioning signal configuration information indicates positioning signals of multiple carriers, the terminal measures the positioning signals of the multiple carriers and obtains a measurement estimation result of each positioning signal. If the positioning signal configuration information indicates positioning signals of multiple RATs, the terminal measures the positioning signals of the multiple RATs and obtains a measurement result of each positioning signal. If the positioning signal configuration information indicates that a measurement result is estimated by using received signal power, the terminal estimates, by using the received signal power, a measurement estimation result of a path corresponding to the received signal power, and measures a ToA to obtain a measurement result of the path.

Step 560: The positioning server positions the terminal by using a measurement estimation result of a positioning signal with a shortest transmission path in the multiple positioning signals.

In an implementation manner, in step 550, the terminal reports the obtained measurement result of each path to the positioning server. In step 560, the positioning server determines a shortest transmission path between the positioning base station and the terminal according to each measurement result, and positions the terminal by using the shortest transmission path.

In another implementation manner, in step 550, the terminal obtains the measurement result of each path, obtains the shortest transmission path according to the measurement result of each path, and reports a measurement result of the shortest transmission path to the positioning server, and the positioning server positions the terminal by using the measurement result of the shortest transmission path.

In the foregoing embodiment, the positioning server configures different positioning signals for the terminal, so that a shortest transmission path through which multiple positioning signals sent by one positioning base station pass can be determined, and the terminal is positioned by using the shortest transmission path; and because the shortest transmission path is closest to an LOS path, although paths through which the positioning signals measured by the terminal pass may all be NLOS paths, in the solutions in this embodiment, the shortest transmission path can still be selected for positioning the terminal, so that a positioning error can be effectively controlled.

Several specific application examples are further provided in the following with reference to the foregoing embodiment.

APPLICATION EXAMPLE 1

In this application example, 2 positioning signals sent by a positioning base station separately on 2 carriers are used as an example for description, the 2 positioning signals pass through different paths, and the paths through which the 2 positioning signals pass may all be NLOS paths, or one of the paths may be an LOS path. In this application example, that the paths through which the 2 positioning signals pass are all NLOS paths is used as an example for description. It should be noted that, no matter whether paths through which positioning signals sent on multiple carriers are LOS paths, in the embodiment of the present invention, a shortest transmission path can still be selected as a path closest to an LOS path, so as to position a terminal, so that a positioning error can be effectively controlled.

Figure 6:
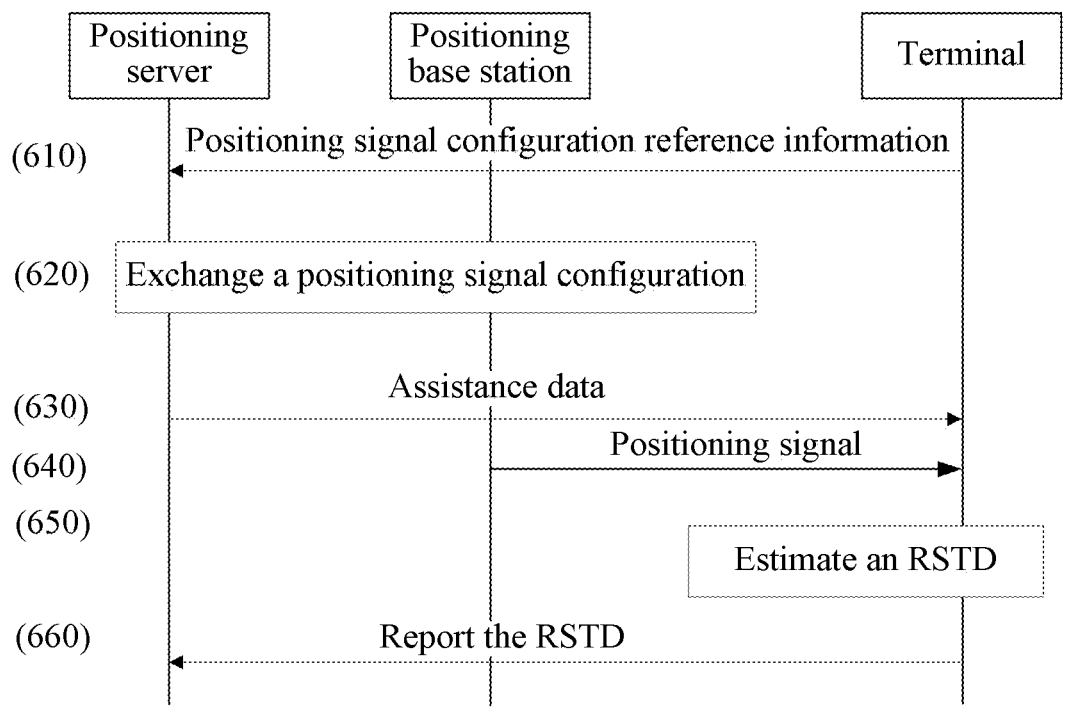
FIG. 6 is a flowchart of a positioning method according to an application example of the present invention.

As shown in FIG. 6, this application example specifically includes the following steps.

Step 610: A terminal sends positioning signal configuration reference information to a positioning server, where the positioning signal configuration reference information includes information of an environment in which the terminal is located and/or positioning signal configuration demand information of the terminal.

The positioning signal configuration demand information of the terminal may be a demand indication that the terminal currently needs multiple carriers. Certainly, the positioning signal configuration demand information of the terminal may further include another demand indication.

In this application example, the positioning signal configuration demand information may be a demand indication indicating that multicarrier positioning signals are needed. Another demand indication is similar to this, which is not described herein again.

Specifically, the terminal may send the positioning signal configuration reference information to the positioning server by using LTE positioning protocol (LPP) signaling.

For example, the LPP signaling may be assistance data request signaling sent by the terminal to the positioning server. Specifically, the terminal may send the positioning signal configuration reference information to the positioning server by using an environment indication information element in the assistance data request signaling, for example, as shown in the following assistance data request signaling:

```
OTDOA-ReqTerminalstAssistanceData ::= SEQUENCE {
...
  nlosIndication    NLOSIndication,
...
}
``` where OTDOA-ReqTerminalstAssistanceData is the assistance data request signaling sent by the terminal to the positioning server; and nlosIndication represents that the environment in which the terminal is located is NLOS.

For another example, the LPP signaling may be assistance data request signaling sent by the terminal to the positioning server. Specifically, the terminal may send the positioning signal configuration reference information to the positioning server by using a demand indication, in the assistance data request signaling, that multicarrier positioning signals are needed, for example, as shown in the following assistance data request signaling:

```
OTDOA-ReqTerminalstAssistanceData ::= SEQUENCE {
   ...
   multiCarrierReq MultiCarrierReq,
   ...
}
``` where OTDOA-ReqTerminalstAssistanceData is the assistance data request signaling sent by the terminal to the positioning server; and multiCarrierReq represents the demand indication that the terminal needs multicarrier positioning signals.

For another example, the LPP signaling may be terminal positioning capability signaling replied by the terminal to the positioning server. Specifically, the terminal may send the positioning signal configuration reference information to the positioning server by using an environment indication information element in the terminal positioning capability signaling, for example, as shown in the following terminal positioning capability signaling:

```
ProvideCapabilities ::= SEQUENCE {
   criticalExtensions    CHOICE {
      c1                 CHOICE {
         ...
         nlosIndication  NLOSIndication,
         ...
      },
      ...
   }
}
``` where ProvideCapabilities is the positioning capability signaling replied by the terminal to the positioning server and used for the positioning server to learn about a positioning capability of the terminal, for example, whether an OTDOA or an eCID is supported; and nlosIndication represents that the environment in which the terminal is located is NLOS.

The terminal positioning capability signaling may also be that:

```
OTDOA-ProvideCapabilities ::= SEQUENCE {
   ...,
   nlosIndication   NLOSIndication OPTIONAL,
}
``` where OTDOA-ProvideCapabilities is OTDOA positioning capability signaling replied by the terminal to the positioning server and used for the positioning server to learn about a specific OTDOA positioning capability of the terminal, for example, a frequency band supported by OTDOA positioning of the terminal; and nlosIndication represents that the environment in which the terminal is located is NLOS.

For another example, the LPP signaling may also be a single piece of signaling, and is dedicated for sending the positioning signal configuration reference information.

Figure 7:
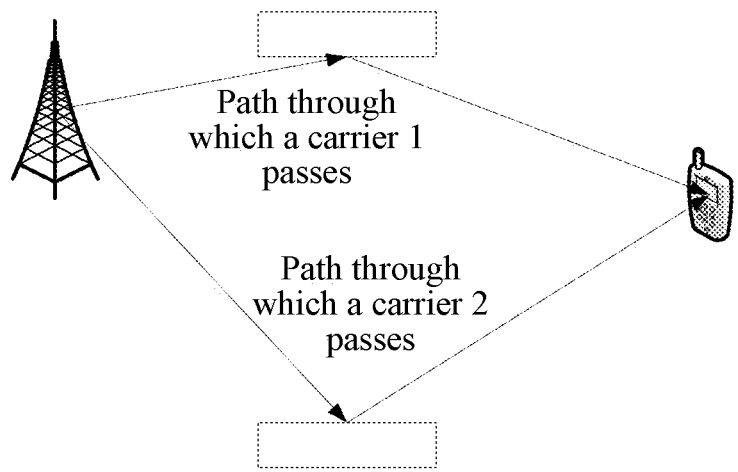
FIG. 7 is a schematic diagram of a scenario according to an application example of the present invention.

Step 620: The positioning server interacts with the positioning base station to determine positioning signal configuration information, where the positioning signal configuration information includes information about a carrier 1 and a carrier 2, and the carrier 1 and the carrier 2 correspond to a positioning signal 1 and a positioning signal 2, respectively, as shown in FIG. 7.

Step 630: The positioning server sends assistance data to the terminal, where the assistance data includes the positioning signal configuration information.

Step 640: The positioning base station sends a positioning signal on the carrier 1 and a positioning signal on the carrier 2.

It should be noted that, this step is not necessarily performed after step 630, a sequence of performing this step and 630 is not limited, and an order of similar steps in the following is either not limited, which will not be described in detail again. In addition, the step of sending the positioning signal is omitted in subsequent embodiments.

Step 650: The terminal estimates, according to the positioning signal configuration information, reference signal time differences (RSTD) for the positioning signals corresponding to the carrier 1 and the carrier 2.

In all the embodiments of the present invention, an RSTD represents a difference between a ToA that a PRS of a neighboring cell arrives at the terminal and a ToA that a PRS of a reference cell arrives at the terminal. It should be noted that, in the embodiment of the present invention, one cell corresponds to one carrier, and one positioning base station may support multiple cells, that is, multiple carriers, or may support one cell, that is, one carrier. In the embodiment of the present invention, the multicarrier mentioned when the shortest transmission path is obtained refers to multiple carriers that one positioning base station supports, so as to obtain a shortest transmission path between the positioning base station and the terminal. For example, the foregoing carrier 1 and carrier 2 are two carriers, that is, two cells supported by one positioning base station. Herein, the neighboring cell refers to another cell (that is, a carrier) participating in positioning except a cell corresponding to the PRS.

Step 660: The terminal reports the estimated RSTDs (that is, measurement estimation results) to the positioning server.

Figure 8:
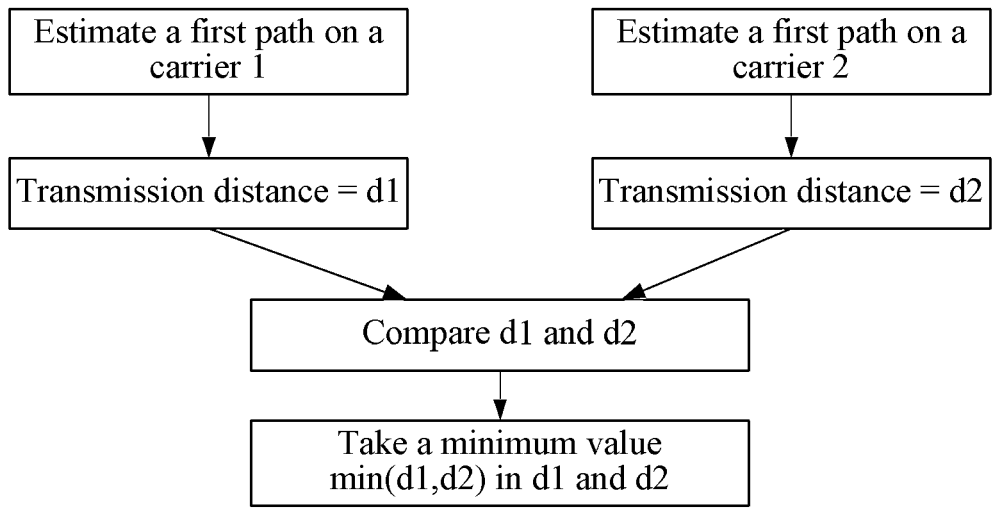
FIG. 8 is a schematic diagram of obtaining a shortest distance according to an application example of the present invention.

In an implementation manner of step 650 and step 660, the terminal may obtain a passing time of each positioning signal according to a ToA of each positioning signal and transmitting timing of each positioning signal, obtain, according to the passing time of each positioning signal, a length of a path through which a corresponding positioning signal passes, and determine a path with a shortest path length to obtain a shortest transmission path in multiple paths, as shown in FIG. 8. An RSTD corresponding to the shortest transmission path is obtained, and the RSTD corresponding to the shortest transmission path is reported to the positioning server, so that the positioning server positions the terminal according to the RSTD corresponding to the shortest transmission path.

In another implementation manner, the terminal may obtain an RSTD of each positioning signal, and report, to the positioning server, the RSTD of each positioning signal and a ToA of a reference cell (that is, a reference carrier) used when the RSTD is calculated. The positioning server determines, according to the RSTD of each positioning signal and the ToA of the reference cell which are reported by the terminal, ToAs of the positioning signals corresponding to the carrier 1 and the carrier 2, obtains, according to sending moments of the positioning signals and the ToAs of the positioning signals corresponding to the carrier 1 and the carrier 2, lengths of paths of the positioning signals corresponding to the carrier 1 and the carrier 2, and further determines a shortest transmission path in the paths of the positioning signals corresponding to the carrier 1 and the carrier 2. Finally, the positioning server positions the terminal according to the shortest transmission path. Alternatively, the terminal may obtain an RSTD of each positioning signal, and report, to the positioning server, the RSTD of each positioning signal and a distance (obtained according to a ToA of a positioning signal of a reference cell) between a positioning base station corresponding to the reference cell (that is, a reference carrier) used when the RSTD is calculated and the terminal. The positioning server determines, according to the RSTD of each positioning signal and the distance between the positioning base station corresponding to the reference cell and the terminal, which are reported by the terminal, lengths of transmission paths of the positioning signals corresponding to the carrier 1 and the carrier 2, and further determines a shortest transmission path in the paths of the positioning signals corresponding to the carrier 1 and the carrier 2. Finally, the positioning server positions the terminal according to the shortest transmission path.

In this implementation manner, the terminal may report the estimated RSTD to the positioning server by using OTDOA signal measurement information signaling, as shown in the following:

```
OTDOA-SignalMeasurementInformation ::= SEQUENCE {
    ... toaRef          ToARef              OPTIONAL,
    ...
}
``` where OTDOA-SignalMeasurementInformation is the OTDOA signal measurement information signaling sent by the terminal to the positioning server and used for sending an OTDOA positioning measurement result to the positioning server, so that the positioning server can perform positioning calculation according to an OTDOA measurement result reported by the terminal, and estimate a location of the terminal; and toaRef represents the ToA of the reference cell (that is, the reference carrier) or information of the distance between the base station corresponding to the reference cell and the terminal; and a function of this piece of signaling is reporting, to the positioning server, the RSTD of each positioning signal and the ToA of the reference cell (that is, the reference carrier) used when the RSTD is calculated, or reporting, to the positioning server, the RSTD of each positioning signal and the distance between the positioning base station corresponding to the reference cell (that is, the reference carrier) used when the RSTD is calculated and the terminal.

In the foregoing application example, the positioning server configures positioning signals of multiple carriers, so that a shortest transmission path through which multiple positioning signals sent by one positioning base station pass can be determined, and the terminal is positioned by using the shortest transmission path; and because the shortest transmission path is closest to an LOS path, although paths through which positioning signals measured by the terminal pass may all be NLOS paths, in the solutions in this embodiment, the shortest transmission path can still be selected for positioning the terminal, so that the positioning error can be effectively controlled.

APPLICATION EXAMPLE 2

Figure 9:
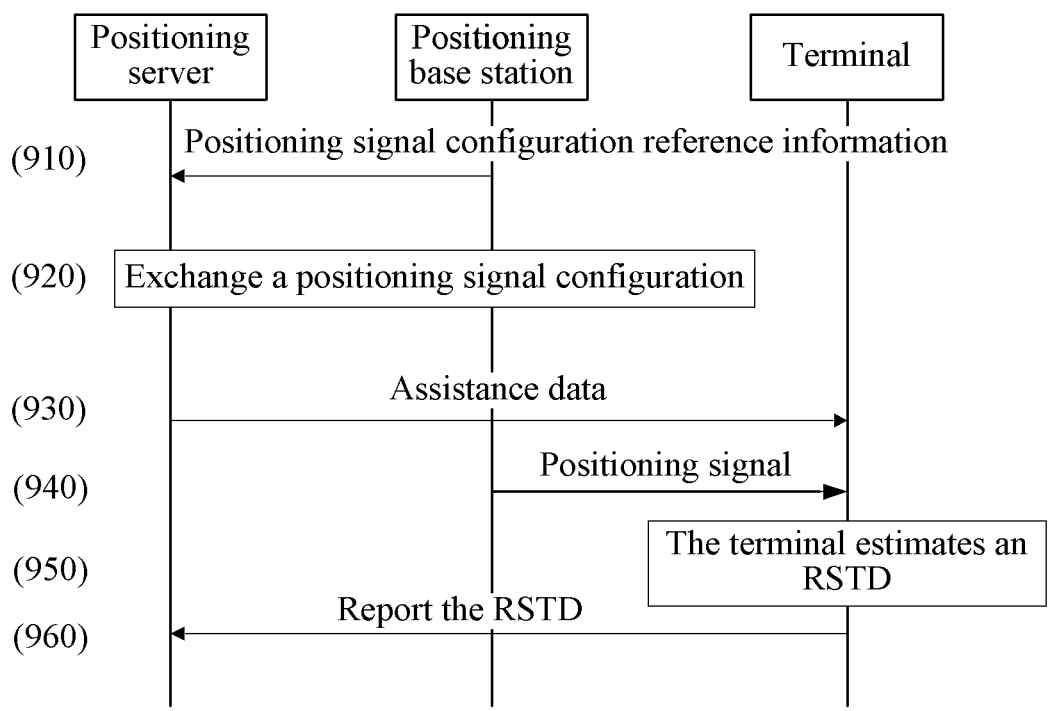
FIG. 9 is a flowchart of a positioning method according to another application example of the present invention.

In this application example, 2 positioning signals sent by a positioning base station separately using 2 RATs are used as an example for description, these 2 positioning signals pass through different paths, and paths through which the 2 positioning signals pass may all be NLOS paths, or one of the paths may be an LOS path. In this application example, that the paths through which the 2 positioning signals pass are all NLOS paths is used as an example for description, as shown in FIG. 9. It should be noted that, no matter whether positioning signals sent using multiple RATs are LOS paths, in the embodiment of the present invention, a shortest transmission path can still be selected as a path closest to an LOS path, so as to position a terminal, so that a positioning error can be effectively controlled.

Step 910: A positioning base station sends positioning signal configuration reference information to a positioning server, where the positioning signal configuration reference information includes one or more of the following: a surrounding environment in which the positioning base station is located, information of an environment in which the terminal is located, and positioning signal configuration demand information of the terminal.

Specifically, the positioning base station may send the positioning signal configuration reference information to the positioning server by using LPPa signaling.

In this application example, the positioning signal configuration demand information may be a demand indication indicating that multi-RAT positioning signals are needed. Another demand indication is similar to this, which is not described herein again.

For example, the LPPa signaling is assistance data feedback signaling sent by the positioning base station to the positioning server, and for example, an information element used to indicate the positioning signal configuration reference information may be added into the assistance data feedback signaling to send the positioning signal configuration reference information. Specifically, an NLOS indication (NLOSIndication) information element may be added into an OTDOA cell information (OTDOA Cell Information) information element to send the positioning signal configuration reference information. Details are shown as follows:

```
OTDOACell-Information-Item ::= CHOICE {
    pCI                 PCI,
    cellId              ECGI,
    ...
    nlosIndication      NLOS Indication,
}
``` where OTDOACell-Information-Item represents OTDOA positioning cell information signaling and is used for the positioning base station to send original positioning signal configuration information, that is, positioning signal configuration information originally configured by an OAM, of the positioning base station to the positioning server, so that the positioning server collects positioning signal configuration information of multiple positioning base stations and selectively send these pieces of positioning signal configuration information to the terminal, facilitating positioning measurement performed by the terminal; PCI represents a physical cell identifier (physical cell identifier, PCI); cell ID represents an E-UTRAN system global cell identifier (E-UTRAN Cell Global Identifier, ECGI), where E-TURAN is an evolved universal terrestrial radio access network; and NLOSIndication is used to indicate an NLOS environment.

For another example, the LPPa signaling may also be a single piece of signaling, and is dedicated for sending the positioning signal configuration reference information.

Figure 10:
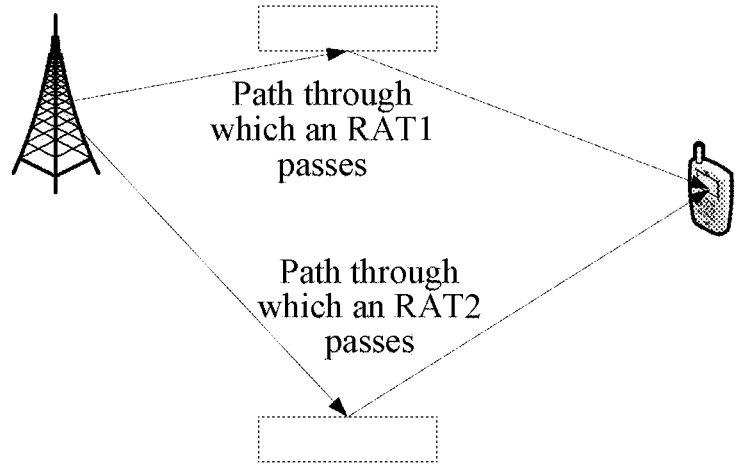
FIG. 10 is a schematic diagram of a scenario according to another application example of the present invention.

Step 920: The positioning server interacts with the positioning base station to determine positioning signal configuration information, where the positioning signal configuration information includes information about an RAT1 and an RAT2, and the RAT1 and the RAT2 correspond to a positioning signal 1 and a positioning signal 2, respectively, as shown in FIG. 10.

Step 930: The positioning server sends assistance data to the terminal, where the assistance data includes the positioning signal configuration information.

Step 940: The positioning base station sends a positioning signal using the RAT1 and a positioning signal using the RAT2.

Step 950: The terminal estimates, according to the positioning signal configuration information, reference signal time differences (RSTD) for the positioning signals corresponding to the RAT1 and the RAT2.

Step 960: The terminal reports the estimated RSTDs to the positioning server.

For a specific implementation manner of the foregoing step 950 and step 960, reference may be made to the descriptions in the foregoing embodiment, and the carrier 1 and the carrier 2 are directly replaced with the RAT1 and the RAT2, which is not described again in this application example.

Step 970: The positioning server positions the terminal by using an RSTD corresponding to a shortest transmission path.

In the foregoing application example, the positioning server configures positioning signals of multiple RATs, so that a shortest transmission path through which multiple positioning signals sent by one positioning base station pass can be determined, and the terminal is positioned by using the shortest transmission path; and because the shortest transmission path is closest to an LOS path, although paths through which positioning signals measured by the terminal pass may all be NLOS paths, in the solutions in this embodiment, the shortest transmission path can still be selected for positioning the terminal, so that the positioning error can be effectively controlled.

APPLICATION EXAMPLE 3

Figure 11:
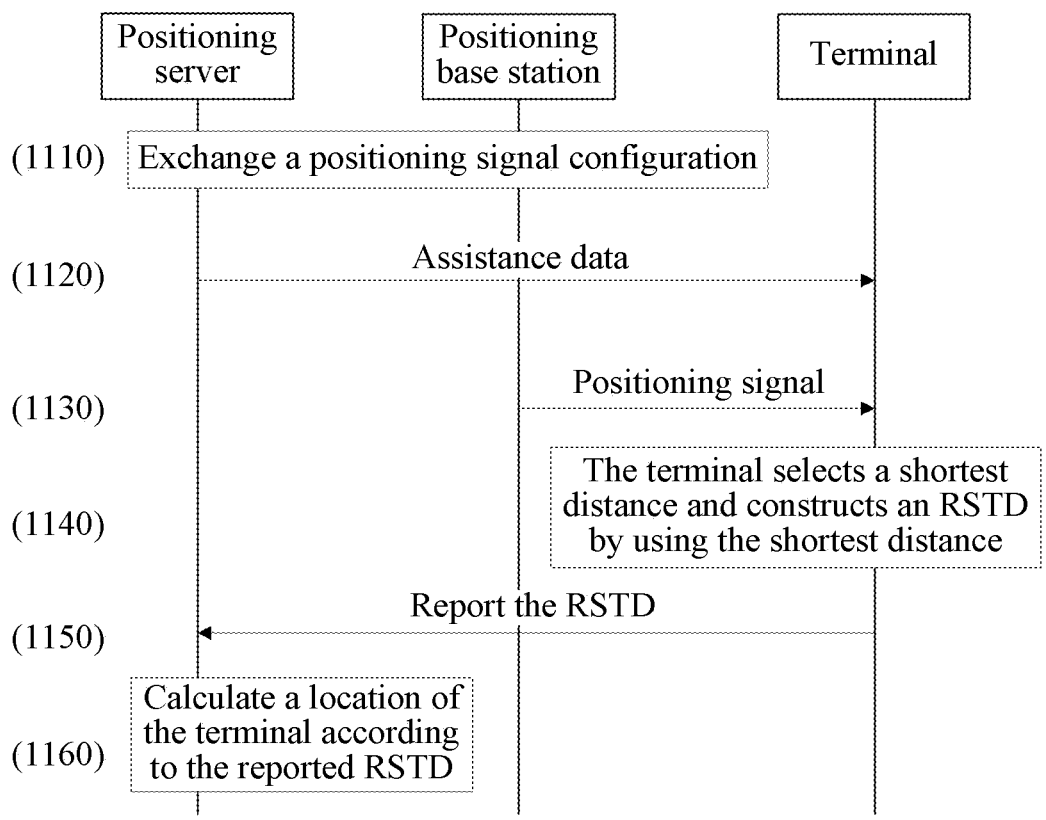
FIG. 11 is a flowchart of a positioning method according to another application example of the present invention.

In this application example, 1 positioning signal is sent from a positioning base station, a terminal measures receive power and/or an SNR of the positioning signal and measures a ToA of the positioning signal, uses the receive power and/or the SNR, and the ToA as parameters of different paths through which the positioning signal passes, and obtains a shortest transmission path in paths corresponding to the receive power (or the SNR, or the received power and the SNR) and the ToA. Therefore, in the embodiment of the present invention, the shortest transmission path can still be selected as a path closest to an LOS path as shown in FIG. 11, so as to position the terminal, so that a positioning error can be effectively controlled.

Step 1110: A positioning server interacts with a positioning base station to determine positioning signal configuration information, where the positioning signal configuration information includes transmitting timing, bandwidth information, and the like of a positioning signal. The positioning signal configuration information herein is the same as that in the prior art.

Step 1120: The positioning server sends assistance data to the terminal, where the assistance data includes the positioning signal configuration information.

Step 1130: The positioning base station sends a positioning signal.

Step 1140: The terminal receives the positioning signal, measures receive power of the positioning signal and/or a signal to noise ratio (SNR) of the positioning signal, and estimates a first distance between the terminal and the positioning base station according to the receive power and/or the SNR, and a signal propagation loss.

For example, a signal propagation loss formula is $P=X+Y*\log 10(d)$, where P represents a signal propagation loss value in a unit of dB; X and Y are factors in a path loss formula and are static constants, and d represents a distance between the terminal and the base station, and is a variable. If transmit power of a reference signal at a base station side is Z1 (dB), and receive power of the reference signal received by the terminal is Z2 (dB), a propagation loss of the reference signal is Z2−Z1; therefore, the distance d between the terminal and the base station can be obtained according to that $Z2-Z1=X+Y*\log 10(d)$.

Step 1150: The terminal reports an RSTD to the positioning server.

Step 1160: The positioning server positions the terminal by using an RSTD corresponding to a shortest transmission path.

In another implementation manner, in step 1140, the terminal obtains, through measurement, the receive power and/or the SNR of the positioning signal; meanwhile, the terminal obtains, through measurement, the ToA of the positioning signal, and obtains an RSTD corresponding to the ToA; in step 1150, the terminal reports, to the positioning server, the receive power and/or the SNR that is obtained through measurement, and receive power and/or an SNR that corresponds to a reference cell, and reports the ToA and the RSTD; and in step 1160, the positioning server estimates the first distance between the terminal and the positioning base station according to the receive power and/or the SNR, and a path loss, obtains a second distance according to the ToA and the RSTD, selects, from the first distance and the second distance, a shorter distance as a shortest transmission path between the positioning base station and the terminal, and obtains an RSTD corresponding to the shortest distance. In step 1150, the terminal may report, to the positioning server by using LPP signaling, the receive power and/or the SNR that is obtained through measurement, and the receive power and/or the SNR that corresponds to the reference cell; specifically, the terminal may report the receive power and/or the SNR that is obtained through measurement, and the receive power and/or the SNR that corresponds to the reference cell to the positioning server by using OTDOA signal measurement information signaling (OTDOA-SignalMeasurementInformation), neighboring cell measurement list signaling (NeighbourMeasurementList), and neighboring cell measurement element signaling (NeighbourMeasurementElement), as shown in the following:

```
OTDOA-SignalMeasurementInformation ::= SEQUENCE {
  ...
  prpRef                  PRPRef                    OPTIONAL,
  neighbourMeasurementList NeighbourMeasurementList,
  ...
}
NeighbourMeasurementList    ::=    SEQUENCE    (SIZE(1..24))    OF
```

```
NeighbourMeasurementElement
    NeighbourMeasurementElement ::= SEQUENCE {
        ...
        prpNeighbour        PRPNeighbour        OPTIONAL,
        ,
        ...
    }
``` where OTDOA-SignalMeasurementInformation is OTDOA signal measurement information signaling sent by the terminal to the positioning server for notifying the positioning server of an OTDOA positioning measurement result, so that the positioning server can position the terminal according to the OTDOA positioning measurement result reported by the terminal; neighbourMeasurementList represents a neighboring cell measurement result list; NeighbourMeasurementElement represents a neighboring cell measurement result element; one neighboring cell measurement result list may include multiple neighboring cell measurement result elements; and this neighboring cell measurement result element is a measurement result of the positioning signal measured by the terminal, so that the positioning server can position the terminal according to these measurement results; and prpRef represents positioning signal receive power of the reference cell, the terminal reports, to the positioning server, receive power of a positioning signal sent by the reference cell, so that the positioning server estimates the first distance with reference to a signal propagation loss model, and meanwhile, the positioning server obtains the second distance according to the ToA and the RSTD that are reported by the terminal, and the positioning server selects the shortest transmission path to position the terminal; and prpNeighbour represents positioning signal receive power of a neighboring cell, for example, receive power of a positioning signal corresponding to the first distance in this application example.

In the foregoing application example, two measurement results are obtained by using two measurement manners, so that a shortest transmission path through which one positioning signal sent by one positioning base station passes can be determined, and the terminal is positioned by using the shortest transmission path; and because the shortest transmission path is closest to an LOS path, although paths through which a positioning signal measured by the terminal passes may all be NLOS paths, in the solutions in this embodiment, the shortest transmission path can still be selected for positioning the terminal, so that the positioning error can be effectively controlled.

Figure 12:
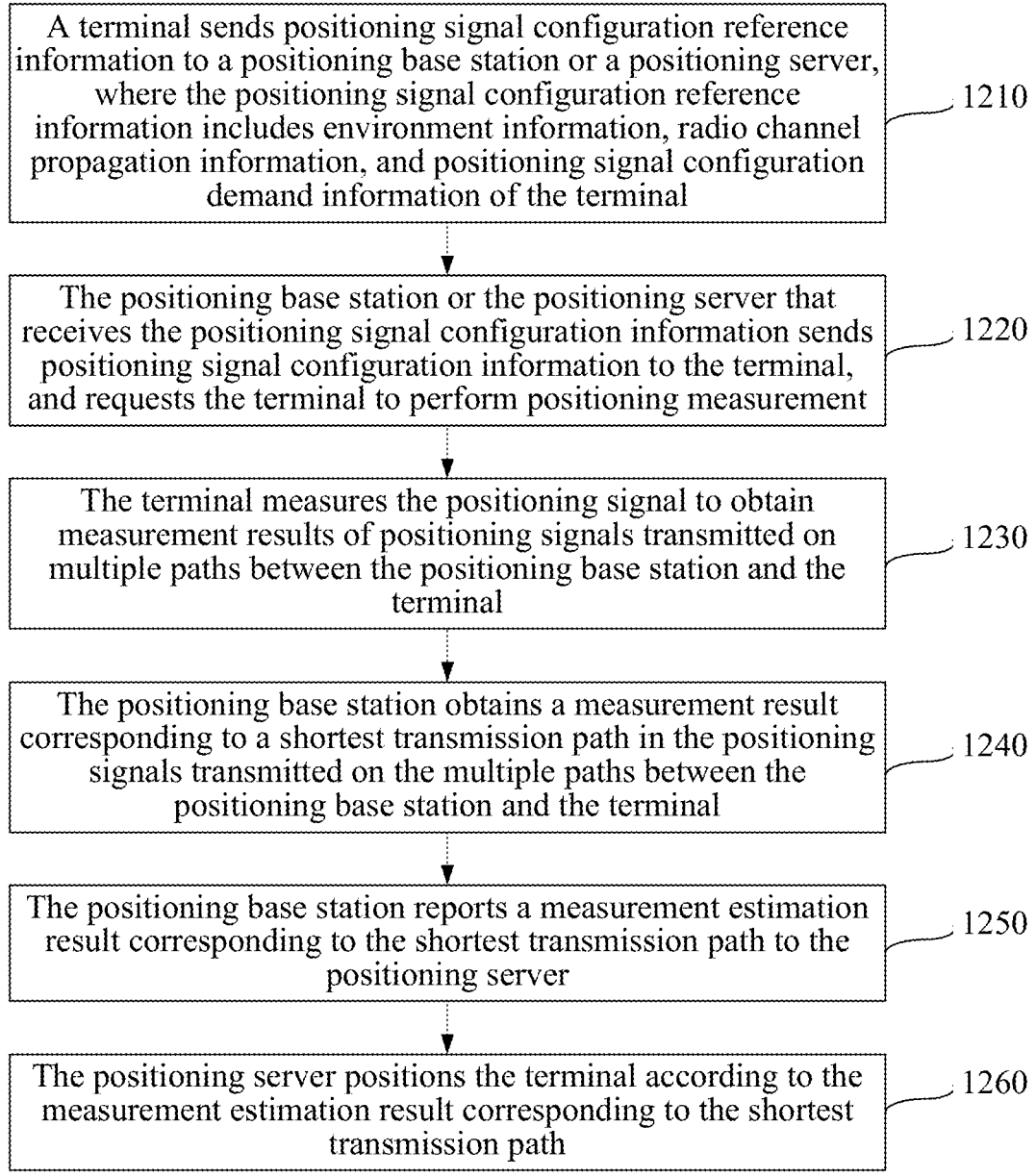
FIG. 12 is a flowchart of a positioning method according to another embodiment of the present invention.

Another embodiment of the present invention provides a positioning method, where the positioning method is an improved eCID positioning method. As shown in FIG. 12, the method includes the following steps.

Step 1210: A terminal sends positioning signal configuration reference information to a positioning base station or a positioning server, where the positioning signal configuration reference information includes environment information, radio channel propagation information, and positioning signal configuration demand information of the terminal.

It should be noted that, this step is an optional step, and the positioning signal configuration reference information may not be sent to the positioning server; in this case, the positioning server may configure the positioning signal configuration reference information according to a preconfiguration when configuring a positioning signal.

For the positioning signal configuration reference information, reference may be made to the descriptions in the above, which is not described herein again.

It should be noted that, this step is an optional step, and the positioning signal configuration reference information may also be preconfigured, and the terminal does not need to send the positioning signal configuration reference information to the positioning base station.

Step 1220: The positioning base station or the positioning server that receives the positioning signal configuration information sends the positioning signal configuration information to the terminal, and requests the terminal to perform positioning measurement.

If step 1210 is performed, the positioning signal configuration information is determined according to the positioning signal configuration reference information. If step 1210 is not performed, the positioning base station or the positioning server determines the positioning signal configuration information according to preconfigured positioning signal configuration reference information.

Specifically, the positioning base station may request the terminal to measure a receiving and transmitting (Rx-Tx) time difference, that is, request the terminal to measure a transmission time of a positioning signal.

Step 1230: The terminal measures the positioning signals to obtain measurement results of the positioning signals transmitted on multiple paths between the positioning base station and the terminal.

Specifically, the terminal may measure the positioning signals to obtain Rx-Tx time differences of the positioning signals.

Step 1240: The positioning base station obtains a measurement result corresponding to a shortest transmission path in the multiple paths of the positioning signals transmitted between the positioning base station and the terminal.

Step 1230 and step 1240 may have multiple implementation manners. In an implementation manner, after obtaining a measurement result of each path between the positioning base station and the terminal, the terminal selects a path with a shortest length from paths through which the positioning signal passes, for example, obtains, according to a ToA and transmitting timing of the signal, a time taken by the signal to pass through each path, so as to calculate a transmission distance of the positioning signal, and select a path with a shortest transmission distance as the shortest transmission path. The terminal reports the measurement result corresponding to the shortest transmission path to the positioning base station, so as to obtain the measurement result corresponding to the shortest transmission path in the multiple paths of the positioning signals transmitted between the positioning base station and the terminal.

In another implementation manner, after obtaining a measurement result of each path between the positioning base station and the terminal, the terminal reports the measurement result of each path, for example, an Rx-Tx time difference of each path, to the positioning base station. The positioning base station selects, from the measurement result of each path, a path with a shortest length in paths through which the positioning signal passes, so as to obtain the measurement result corresponding to the shortest transmission path in the paths of the positioning signals transmitted on the multiple paths between the positioning base station and the terminal.

Step 1250: The positioning base station reports a measurement estimation result corresponding to the shortest transmission path to the positioning server.

Step 1260: The positioning server positions the terminal according to the measurement estimation result corresponding to the shortest transmission path.

In the foregoing embodiment, the terminal measures the positioning signals transmitted on the multiple paths between the positioning base station and the terminal, so that the positioning server can obtain the measurement estimation result corresponding to the shortest transmission path, and position the terminal by using the measurement estimation result corresponding to the shortest transmission path; and because the shortest transmission path is closest to an LOS path, although paths through which a positioning signal measured by the terminal passes may all be NLOS paths, in the solutions in this embodiment, the shortest transmission path can still be selected for positioning the terminal, so that a positioning error can be effectively controlled.

Several specific application examples are further provided in the following with reference to the foregoing embodiment.

APPLICATION EXAMPLE 4

In this application example, 2 positioning signals sent by a positioning base station separately on 2 carriers are used as an example for description. For other descriptions, reference may be made to the descriptions in the forgoing application example, which is not described herein again.

Figure 13:
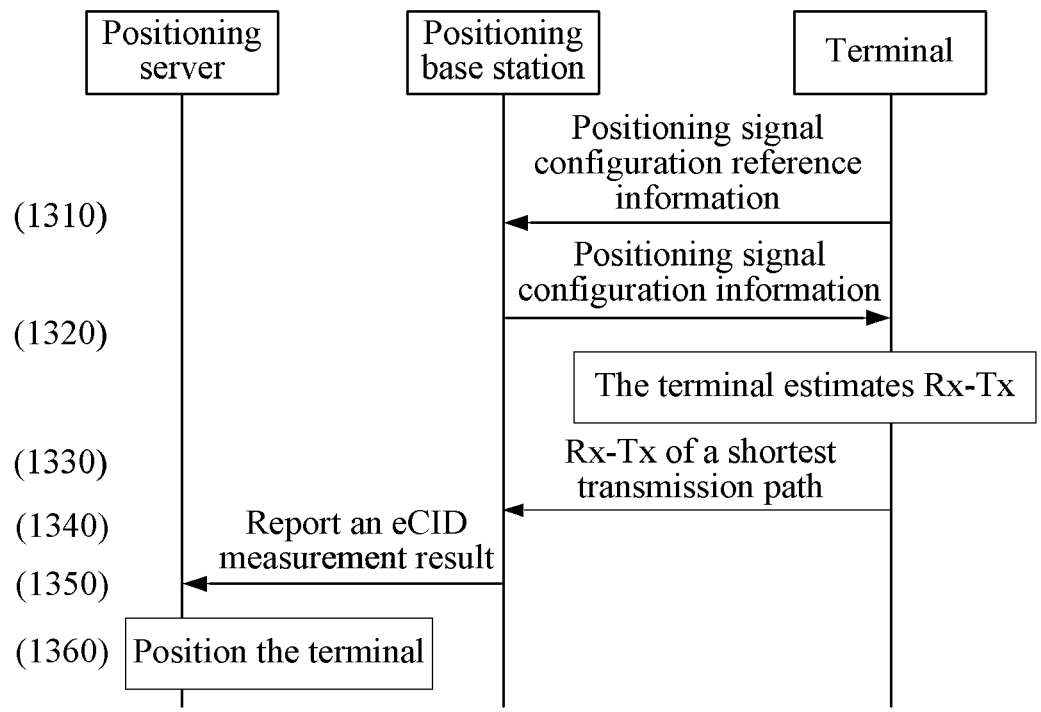
FIG. 13 is a flowchart of a positioning method according to another application example of the present invention.

As shown in FIG. 13, this application example specifically includes the following steps.

Step 1310: A terminal sends positioning signal configuration reference information to a positioning base station, where the positioning signal configuration reference information includes information of an environment in which the terminal is located and/or positioning signal configuration demand information of the terminal.

In this application example, the positioning signal configuration demand information of the terminal is a demand indication that the terminal currently needs multiple carriers. Certainly, the positioning signal configuration demand information of the terminal may further include another demand indication.

Specifically, the terminal may send the positioning signal configuration reference information to the positioning base station by using radio resource control (radio resource control, RRC) signaling.

For example, the RRC signaling may be RRC connection signaling; and specifically, the terminal may send the positioning signal configuration reference information to a positioning server by using an environment indication information element in RRC connection request signaling, for example, as shown in the following RRC connection request signaling:

| | |
|---|---|
| RRCConnectionRequest ::= | SEQUENCE { |
| criticalExtensions | CHOICE { |
| ... | |
| nlosIndication | NLOSIndication, |
| ... | |
| } | |
| } | | where nlosIndication represents that the environment in which the terminal is located is NLOS; and certainly, if the positioning signal configuration reference information further includes other information, another information element may be further added into the RRC connection request signaling to carry related information, and for details, refer to the foregoing nlosIndication information element, which is not described herein again.

For another example, the RRC signaling may also be a single piece of signaling, and is dedicated for sending the positioning signal configuration reference information.

Step 1320: The positioning base station sends positioning signal configuration information to the terminal, and requests the terminal to perform positioning measurement.

In this application example, the positioning signal configuration information includes a information about carrier 1 and a carrier 2, which correspond to a positioning signal 1 and a positioning signal 2, respectively.

Step 1330: The terminal measures a respective transmission time of the positioning signal 1 and the positioning signal 2, that is an Rx–Tx time difference, so as to obtain a shorter transmission time in the transmission time corresponding to the positioning signal 1 and the transmission time corresponding to the positioning signal 2, where the positioning signal corresponding to the shorter transmission time is a positioning signal corresponding to a shortest transmission path between the positioning base station and the terminal.

Specifically, the terminal measures ToAs of the positioning signal 1 and the positioning signal 2, obtains the transmission time of the positioning signal 1 and the transmission time of the positioning signal 2 according to transmitting timing and the ToAs of these two positioning signals, and determines the shorter transmission time in the transmission time corresponding to the positioning signal 1 and the transmission time corresponding to the positioning signal 2, where the positioning signal corresponding to the shorter transmission time is the positioning signal corresponding to the shortest transmission path between the positioning base station and the terminal.

Step 1340: The terminal sends the transmission time (that is, a measurement estimation result) corresponding to the shortest transmission path to the positioning base station.

Specifically, the terminal sends (Rx–Tx) time different at a terminal side and of the positioning signal corresponding to the shortest transmission path to the positioning base station.

Step 1350: The positioning base station reports an eCID measurement result including the transmission time corresponding to the shortest transmission path to the positioning server.

Specifically, the eCID measurement result reported by the positioning base station to the positioning server includes one or more of the following: an Rx–Tx time difference at a positioning base station side, the Rx–Tx time difference at the terminal side, and an angle of arrival of an uplink signal of the terminal, which is estimated by the positioning base station.

Step 1360: The positioning server positions the terminal by using the eCID measurement result.

Specifically, the positioning server can obtain a loopback time of a signal between the terminal and the positioning base station according to the Rx–Tx time difference at the positioning base station side and the Rx–Tx time difference at the terminal side, determine a distance between the terminal and the positioning base station by dividing the loopback time by 2 and then multiplying an obtained value by the light speed, that is, determine that the terminal is located in a positioning circle with the positioning base station as a circle center and the distance between the terminal and the base station as a radius; the positioning server can determine, according to the angle of arrival of the uplink signal of the terminal, which is obtained through measurement by the positioning base station, that the terminal is located in a ray with the base station as a ray start point; and the positioning server can determine a location of the terminal according to an intersection point between the ray and the positioning circle.

It should be noted that, how to obtain the eCID measurement result in step 1350, and that the positioning server positions the terminal by using the eCID measurement result in step 1360 belong to the prior art, which is not described herein again. A method in the following is similar to this.

In the foregoing application example, the terminal measures positioning signals transmitted on multiple paths between the positioning base station and the terminal, so that the positioning server can obtain a measurement result corresponding to the shortest transmission path, and position the terminal by using the measurement result corresponding to the shortest transmission path; and because the shortest transmission path is closest to an LOS path, although paths through which the positioning signals measured by the terminal pass may all be NLOS paths, in the solutions in this embodiment, the shortest transmission path can still be selected for positioning the terminal, so that a positioning error can be effectively controlled.

APPLICATION EXAMPLE 5

Figure 14:
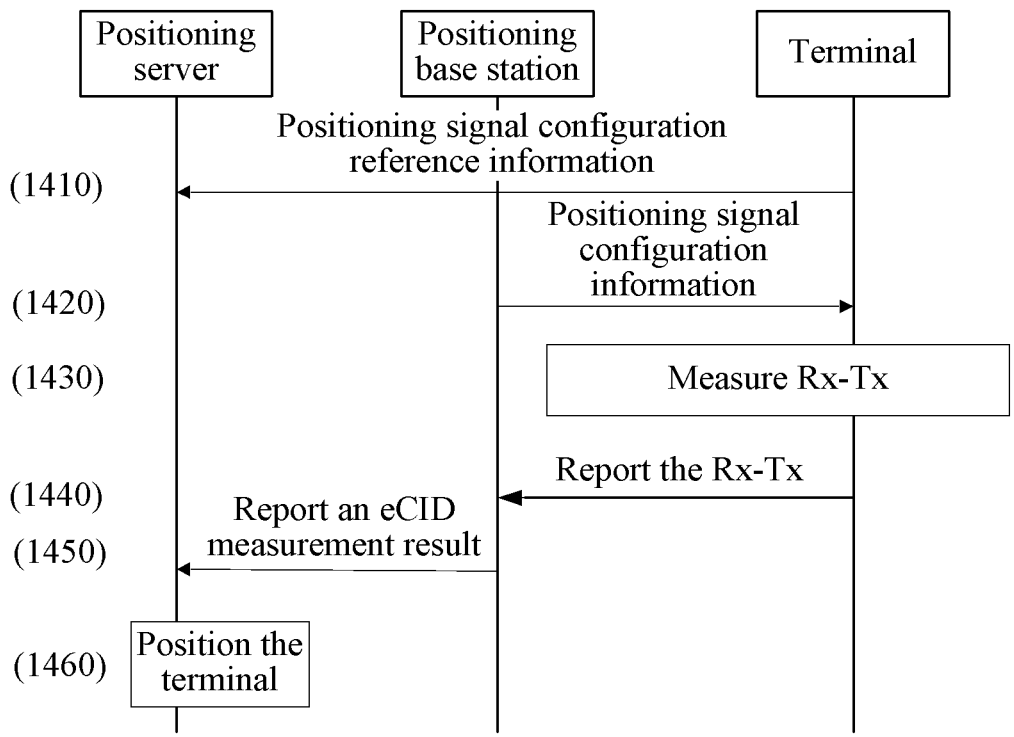
FIG. 14 is a flowchart of a positioning method according to another application example of the present invention.

In this application example, 2 positioning signals sent by a positioning base station separately using 2 RATs are used as an example for description, as shown in FIG. 14.

Step 1410: A terminal sends positioning signal configuration reference information to a positioning server, where the positioning signal configuration reference information includes information of an environment in which the terminal is located and/or positioning signal configuration demand information of the terminal.

Specifically, the terminal may send the positioning signal configuration reference information to the positioning base station by using LPP signaling.

For example, the LPP signaling may be provide positioning capability signaling; and specifically, the terminal may send the positioning signal configuration reference information to the positioning server by using an environment indication information element in positioning capability (ProvideCapabilities) signaling, for example, as shown in the following positioning capability (ProvideCapabilities) signaling:

```
ProvideCapabilities ::= SEQUENCE {
    criticalExtensions    CHOICE {
        c1                CHOICE {
        ...
        nlosIndication    NLOSIndication,
        ...
        },
        ...
    }
}
``` where ProvideCapabilities is positioning capability information signaling replied by the terminal to the positioning server and used for the positioning server to learn about a positioning capability of the terminal, for example, whether an OTDOA or an eCID is supported; and nlosIndication represents that the environment in which the terminal is located is NLOS.

For another example, the signaling may be eCID-provide positioning capability (eCID-ProvideCapabilities) signaling, as shown in the following:

```
ECID-ProvideCapabilities ::= SEQUENCE {
    ...
    nlosIndication    NLOSIndication,
    ...
}
``` where ECID-ProvideCapabilities represents eCID positioning capability information signaling replied by the terminal to the positioning server and used for the terminal to notify the positioning server of eCID positioning capability information of the terminal, for example, whether measurement of Rx-Tx is supported, or whether reference signal received power (reference signal received power, RSRP) measurement is supported.

For another example, the RRC signaling may also be a single piece of signaling, and is dedicated for sending the positioning signal configuration reference information.

Step 1420: The positioning base station sends positioning signal configuration information to the terminal, and requests the terminal to perform positioning measurement.

Before this step, the positioning server may interact with the positioning base station to determine the positioning signal configuration information.

In this application example, the positioning signal configuration information includes information about an RAT1 and an RAT2, which correspond to a positioning signal 1 and a positioning signal 2, respectively.

Step 1430: The terminal measures transmission times of the positioning signal 1 and the positioning signal 2, that is, Rx-Tx time differences (that is, measurement results).

Specifically, the terminal measures Rx-Tx time differences of the positioning signal 1 and the positioning signal 2 at a terminal side.

Step 1440: The terminal sends the transmission times of the positioning signal 1 and the positioning signal 2 to the positioning base station, and the positioning base station obtains a shorter transmission time in the transmission time corresponding to the positioning signal 1 and the transmission time corresponding to the positioning signal 2, where the positioning signal corresponding to the shorter transmission time is a positioning signal corresponding to a shortest transmission path between the positioning base station and the terminal.

Specifically, the terminal sends the Rx-Tx time differences at the terminal side and of the positioning signal 1 and the positioning signal 2 to the positioning base station, and the positioning base station can obtain, according to the Rx-Tx time differences at the terminal side that are obtained through measurement by the terminal, and the Rx-Tx time differences at a base station side that are obtained through measurement by the positioning base station, the transmission time corresponding to the positioning signal 1 and the transmission time corresponding to the positioning signal 2, and select the shorter transmission time in the transmission time corresponding to the positioning signal 1 and the transmission time corresponding to the positioning signal 2, where the positioning signal corresponding to the shorter transmission time is the positioning signal corresponding to the shortest path between the positioning base station and the terminal.

Step 1450: The positioning base station reports an eCID measurement result including the positioning signal corresponding to the shortest transmission path to the positioning server.

Step 1460: The positioning server positions the terminal by using the eCID measurement result (that is, a measurement estimation result).

In the foregoing application example, the terminal measures positioning signals transmitted on multiple paths between the positioning base station and the terminal, so that the positioning server can obtain a measurement result corresponding to the shortest transmission path, and position the terminal by using the measurement result corresponding to the shortest transmission path; and because the shortest transmission path is closest to an LOS path, although paths through which the positioning signals measured by the terminal pass may all be NLOS paths, in the solutions of this embodiment, the shortest transmission path can still be selected for positioning the terminal, so that a positioning error can be effectively controlled.

Figure 15:
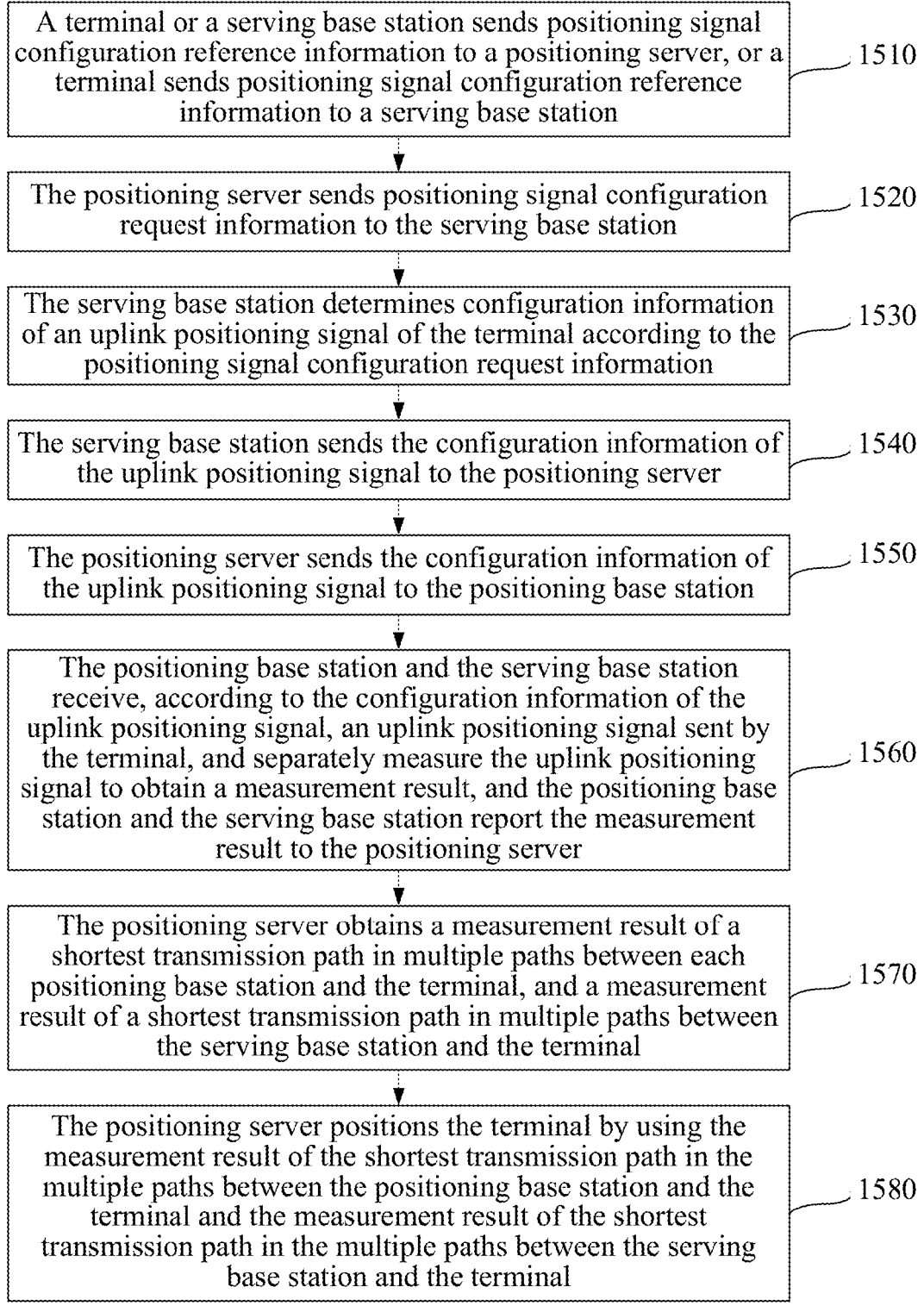
FIG. 15 is a flowchart of a positioning method according to another embodiment of the present invention.

Another embodiment of the present invention provides a positioning method, where the positioning method is an improved UTDOA positioning method. As shown in FIG. 15, the method includes the following steps.

Step 1510: A terminal or a serving base station sends positioning signal configuration reference information to a positioning server, or a terminal sends positioning signal configuration reference information to a serving base station, where the positioning signal configuration reference information includes environment information, radio channel propagation information, and positioning signal configuration demand information of the terminal.

It should be noted that, this step is an optional step, and the positioning signal configuration reference information may not be sent to the positioning server; in this case, the positioning server may configure the positioning signal configuration reference information according to a preconfiguration when configuring a positioning signal.

For the positioning signal configuration reference information, reference may be made to the foregoing descriptions, which is not described herein again.

It should be noted that, this step is an optional step, and the positioning signal configuration reference information may also be preconfigured, and the terminal does not need to send the positioning signal configuration reference information to the serving base station.

In addition, in step 1510, if the terminal sends the positioning signal configuration reference information to the serving base station, step 1520 and step 1530 are not performed, instead, configuration information of the uplink positioning signal is determined according to the positioning signal configuration reference information, and then step 1540 is performed.

Step 1520: The positioning server sends positioning signal configuration request information to the serving base station, where the positioning signal configuration request information includes the positioning signal configuration reference information and/or expected configuration information, and the expected configuration information is expected positioning signal configuration information that is determined by the positioning server according to the positioning signal configuration reference information.

For example, the positioning signal configuration reference information includes a multicarrier demand indication, and the expected configuration information is expected transmit carrier configuration information of an uplink positioning signal of the terminal, which is determined by the positioning server according to the multicarrier demand indication.

For another example, the positioning signal configuration reference information includes a multi-RAT demand indication, and the expected configuration information is expected RAT configuration information of an uplink positioning signal of the terminal, which is determined by the positioning server according to the multicarrier demand indication.

If step 1510 is performed, the positioning signal configuration information is determined according to the positioning signal configuration reference information. If step 1510 is not performed, the serving base station or the positioning server determines the positioning signal configuration information according to preconfigured positioning signal configuration reference information.

Specifically, the positioning base station may request the terminal to measure a receiving and sending (Rx–Tx) time difference, that is, request the terminal to measure a transmission time of a positioning signal.

Step 1530: The serving base station determines configuration information of the uplink positioning signal of the terminal according to the positioning signal configuration request information.

In this step, if the serving base station determines that current configuration information of the uplink positioning signal of the terminal is consistent with the configuration information of the uplink positioning signal that is determined by the serving base station according to the positioning signal configuration request information, the serving base station does not need to send the configuration information of the uplink positioning signal to the terminal. If the serving base station determines that the configuration information of the current uplink positioning signal of the terminal is inconsistent with the configuration information of the uplink positioning signal that is determined by the serving base station according to the positioning signal configuration request information, in this step, the serving base station further sends the configuration information of the uplink positioning signal to the terminal.

Step 1540: The serving base station sends the configuration information of the uplink positioning signal to the positioning server.

Step 1550: The positioning server sends the configuration information of the uplink positioning signal to the positioning base station.

It should be noted that, in the embodiment of the present invention, the positioning base station in the UTDOA positioning method may be a base station, or may be a location measurement unit (location measurement unit, LMU).

Step 1560: The positioning base station and the serving base station receive, according to the configuration information of the uplink positioning signal, an uplink positioning signal sent by the terminal, and separately measure the uplink positioning signal to obtain a measurement result, and the positioning base station and the serving base station report the measurement results to the positioning server.

Step 1570: The positioning server obtains a measurement result of a shortest transmission path in multiple paths between each positioning base station and the terminal, and a measurement result of a shortest transmission path in multiple paths between the serving base station and the terminal.

Step 1560 and step 1570 may have multiple implementation manners. In an implementation manner, after obtaining a measurement result of each path between the positioning base station and the terminal, the positioning base station selects a path with a shortest length from paths through which the uplink positioning signal passes, for example, obtains, according to a ToA and transmitting timing of the signal, a time taken by the signal to pass through each path, so as to calculate a transmission distance of the positioning signal, and select a path with a shortest transmission distance as the shortest transmission path. The positioning base station reports the measurement result corresponding to the shortest transmission path to the positioning server, so that the positioning server obtains the measurement result corresponding to the shortest transmission path in the multiple paths between the positioning base station and the terminal. The serving base station performs same operations.

In another implementation manner, after obtaining a measurement result of each path between the positioning base station and the terminal, the positioning base station reports the measurement result of each path to the positioning server. The positioning server selects, from the measurement result of each path, a path with a shortest length in paths through which the uplink positioning signal passes and between each positioning base station and the terminal, so as to obtain the measurement result corresponding to the shortest transmission path in positioning signals transmitted on the multiple paths between each positioning base station and the terminal. The serving base station also performs same operations.

Step 1580: The positioning server positions the terminal by using the measurement result of the shortest transmission path in the multiple paths between the positioning base station and the terminal and the measurement result of the shortest transmission path in the multiple paths between the serving base station and the terminal.

In the foregoing embodiment, the serving base station and the positioning base station measure the positioning signals transmitted on the multiple paths between the serving base station and the terminal and between the positioning base station and the terminal, so that the positioning server can obtain the measurement result corresponding to the shortest transmission path between each positioning base station and the terminal and the measurement result corresponding to the shortest transmission path between the serving base station and the terminal, and position the terminal by using the measurement results corresponding to the shortest transmission path; and because the shortest transmission path is closest to an LOS path, although paths through which the positioning signals measured by the terminal pass may all be NLOS paths, in the solutions in this embodiment, the shortest transmission path can still be selected for positioning the terminal, so that a positioning error can be effectively controlled.

Several specific application examples are further provided in the following with reference to the foregoing embodiment.

APPLICATION EXAMPLE 6

In this application example, 2 uplink positioning signals sent by a terminal separately on 2 carriers are used as an example for description. For other descriptions, reference may be made to the descriptions in the forgoing application example, which is not described herein again.

Figure 16:
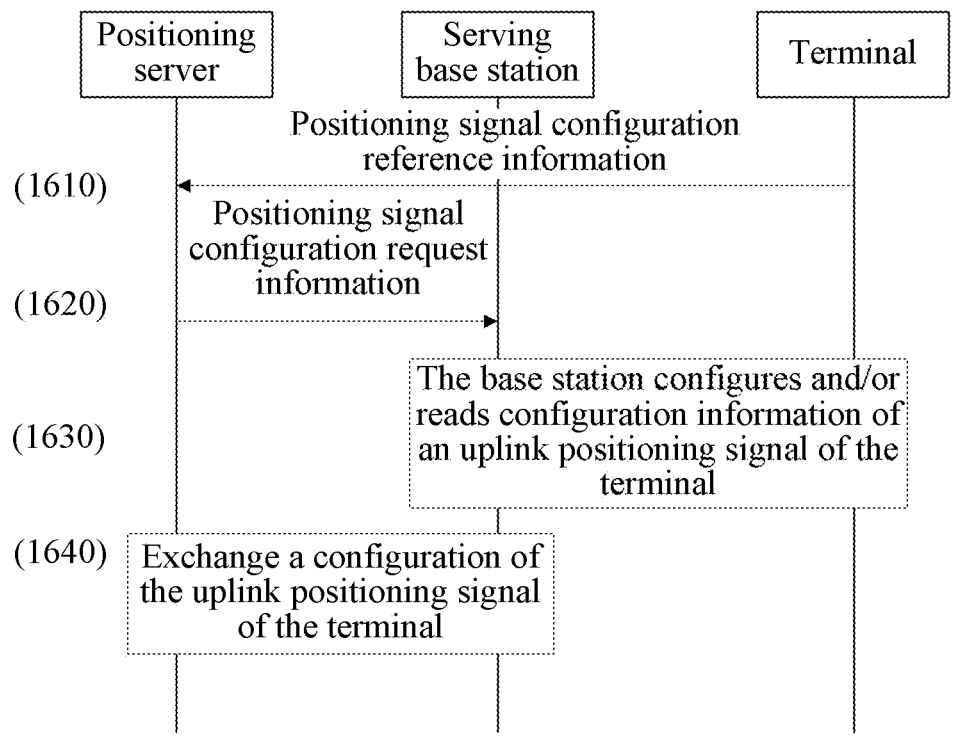
FIG. 16 is a flowchart of a positioning method according to another application example of the present invention.

As shown in FIG. 16, this application example specifically includes the following steps.

Step 1610: A terminal sends positioning signal configuration reference information to a positioning server, where the positioning signal configuration reference information includes information of an environment in which the terminal is located and/or positioning signal configuration demand information of the terminal.

In this application example, the positioning signal configuration demand information of the terminal is a demand indication that the terminal currently needs multiple carriers. Certainly, the positioning signal configuration demand information of the terminal may further include another demand indication.

Specifically, the terminal may send the positioning signal configuration reference information to the positioning server by using LPP signaling.

Step 1620: The positioning server sends positioning signal configuration request information to a serving base station.

In this application example, the positioning signal configuration request information may be the information of the environment in which the terminal is located, a multicarrier demand indication, and that uplink positioning signals that are expected to be configured for the terminal are uplink positioning signals on the 2 carriers.

The positioning server may send the positioning signal configuration request information to the serving base station by using LPPa signaling.

Step 1630: The serving base station determines configuration information of an uplink positioning signal of the terminal according to the positioning signal configuration request information, and sends the configuration information of the uplink positioning signal to the terminal, where the configuration information of the uplink positioning signal includes a carrier 1 and a carrier 2.

Step 1640: The serving base station sends the configuration information of the uplink positioning signal to the positioning server.

Step 1650: The positioning server sends the configuration information of the uplink positioning signal to a positioning base station.

Step 1660 (omitted in the figure): The positioning base station and the serving base station receive, according to the configuration information of the uplink positioning signals, uplink positioning signals corresponding to the carrier 1 and the carrier 2 and sent by the terminal, and the positioning base station and the serving base station separately measure the uplink positioning signals of the carrier 1 and the carrier 2 to obtain measurement results corresponding to the carrier 1 and the carrier 2, and separately report the measurement results to the positioning server.

In this application example, the measurement results may be RSTDs corresponding to ToAs of the uplink positioning signals.

Step 1670 (omitted in the figure): The positioning server estimates, according to RSTDs reported by the serving base station and the positioning base station, a transmission distance of the positioning signal corresponding to each carrier, that is, a distance of a transmission path corresponding to each carrier, and selects a respective shortest transmission path for the serving base station and the positioning base station.

Step 1680 (omitted in the figure): The positioning server positions the terminal by using a measurement result of the shortest transmission path in multiple paths between the positioning base station and the terminal and a measurement result of the shortest transmission path in multiple paths between the serving base station and the terminal.

In the foregoing embodiment, the serving base station and the positioning base station measure the positioning signals transmitted on the multiple paths between the serving base station and the terminal and between the positioning base station and the terminal, so that the positioning server can obtain the measurement result corresponding to the shortest transmission path between each positioning base station and the terminal and the measurement result corresponding to the shortest transmission path between the serving base station and the terminal, and position the terminal by using the measurement result corresponding to the shortest transmission path; and because the shortest transmission path is closest to an LOS path, although paths through which the positioning signals measured by the terminal pass may all be NLOS paths, in the solutions in this embodiment, the shortest transmission path can still be selected for positioning the terminal, so that a positioning error can be effectively controlled.

APPLICATION EXAMPLE 7

Figure 17:
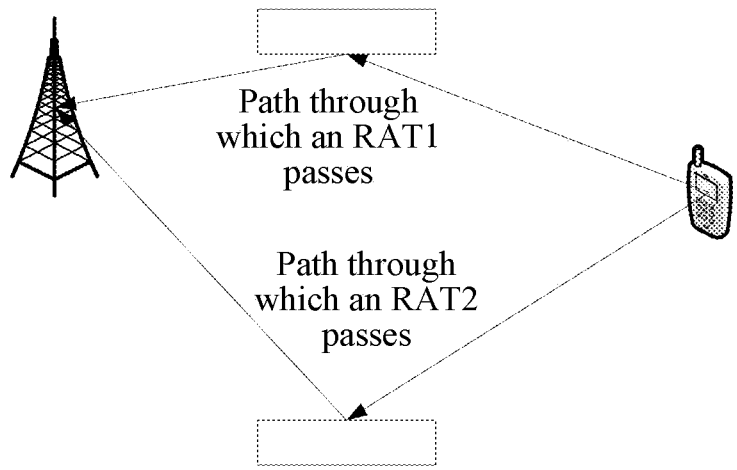
FIG. 17 is a schematic diagram of a scenario according to another application example of the present invention.

In this application example, 2 positioning signals sent by a positioning base station separately using 2 RATs are used as an example for description, as shown in FIG. 17. A difference from the foregoing application example lies in that, in this application example, in step 1610, the serving base station sends the positioning signal configuration reference information to the positioning server. Specifically configured uplink positioning signals are uplink positioning signals corresponding to the 2 RATs. Details are not described herein again.

APPLICATION EXAMPLE 8

Figure 18:
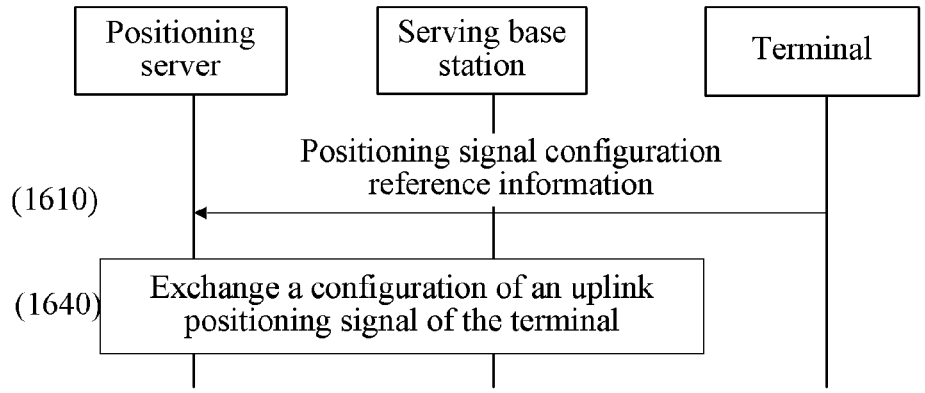
FIG. 18 is a flowchart of a positioning method according to another application example of the present invention.

As shown in FIG. 18, a difference between this application example and the foregoing application example lies in that, in step 1610, the terminal sends the foregoing positioning signal configuration reference information to the serving base station, and then, directly performs step 1640 to step 1680.

APPLICATION EXAMPLE 9

In this application example, 2 uplink positioning signals sent by a terminal separately on 2 carriers are used as an example for description. For other descriptions, reference may be made to the descriptions in the forgoing application example, which is not described herein again.

Figure 19:
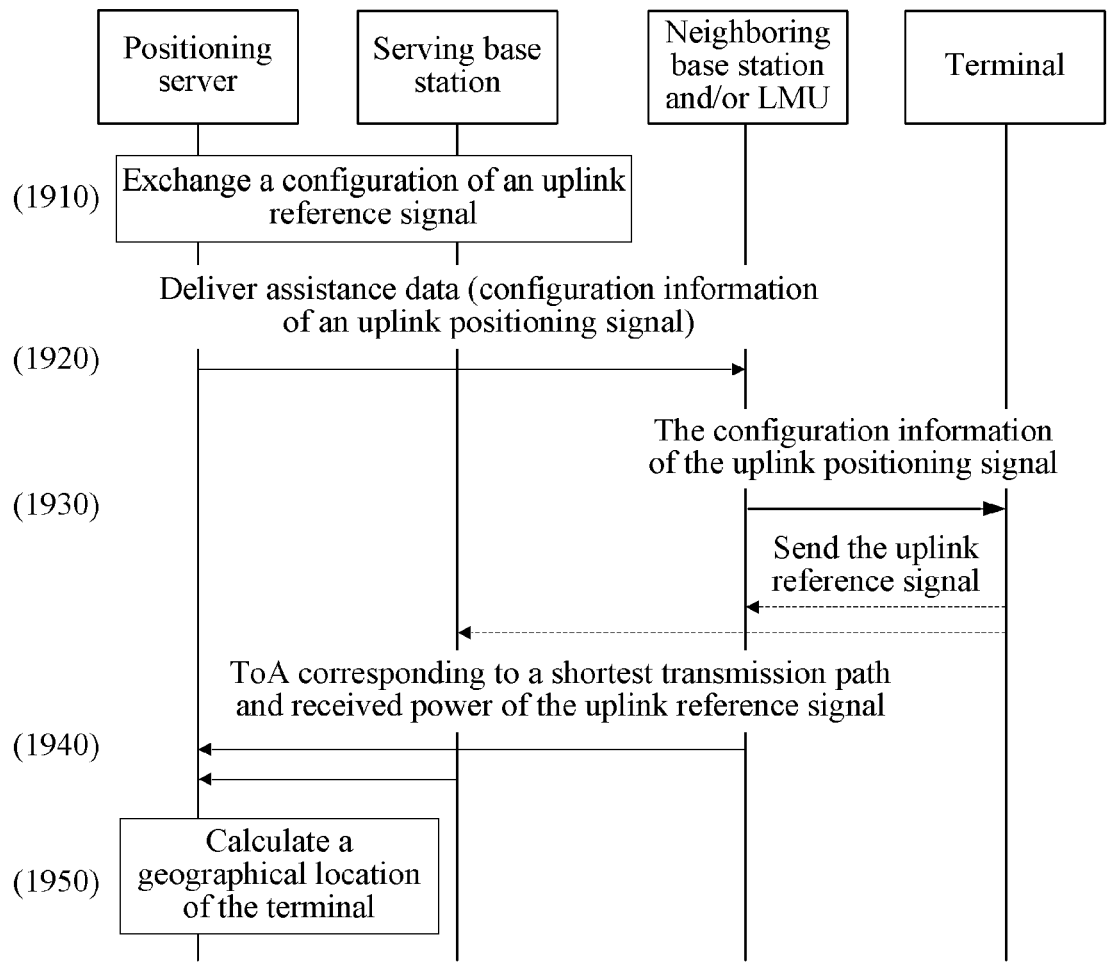
FIG. 19 is a flowchart of a positioning method according to another application example of the present invention.

As shown in FIG. 19, this application example specifically includes the following steps.

Step 1910: A positioning server obtains configuration information of an uplink positioning signal of the terminal from a serving base station.

Step 1920: The positioning server sends the configuration information of the uplink positioning signal of the terminal to a positioning base station.

Step 1930: The positioning base station and the serving base station separately send the configuration information of the uplink positioning signal to the positioning server.

Step 1940: The positioning base station and the serving base station receive, according to the configuration information of the uplink positioning signal, an uplink positioning signal sent by the terminal; each positioning base station separately measures a ToA and receive power (or an SNR) of the uplink positioning signal; the serving base station also separately measures the ToA and the received power (or the SNR) of the uplink positioning signal; and the positioning base station and the serving base station separately obtain path lengths corresponding to the measured ToAs and receive power, obtain a shortest transmission path in the path lengths corresponding to the ToAs and the receive power, and send a ToA or receive power that corresponds to the obtained respective shortest transmission path to the positioning server.

Step 1950: The positioning server positions the terminal according to the ToA or the received power that corresponds to the shortest transmission path reported by the serving base station and the positioning base station.

In the foregoing embodiment, the serving base station and the positioning base station measure the positioning signals transmitted on the multiple paths between the serving base station and the terminal and between the positioning base station and the terminal, so that the positioning server can obtain a measurement result corresponding to a shortest transmission path between each positioning base station and the terminal and a measurement result corresponding to a shortest transmission path between the serving base station and the terminal, and position the terminal by using the measurement result corresponding to the shortest transmission path; and because the shortest transmission path is closest to an LOS path, although paths through which the positioning signals measured by the terminal pass may all be NLOS paths, in the solutions in this embodiment, the shortest transmission path can still be selected for positioning the terminal, so that a positioning error can be effectively controlled.

On the other hand, for a case in which the positioning accuracy is affected by the positioning signal strength loss and the SINR loss, the following embodiments are provided.

Figure 20:
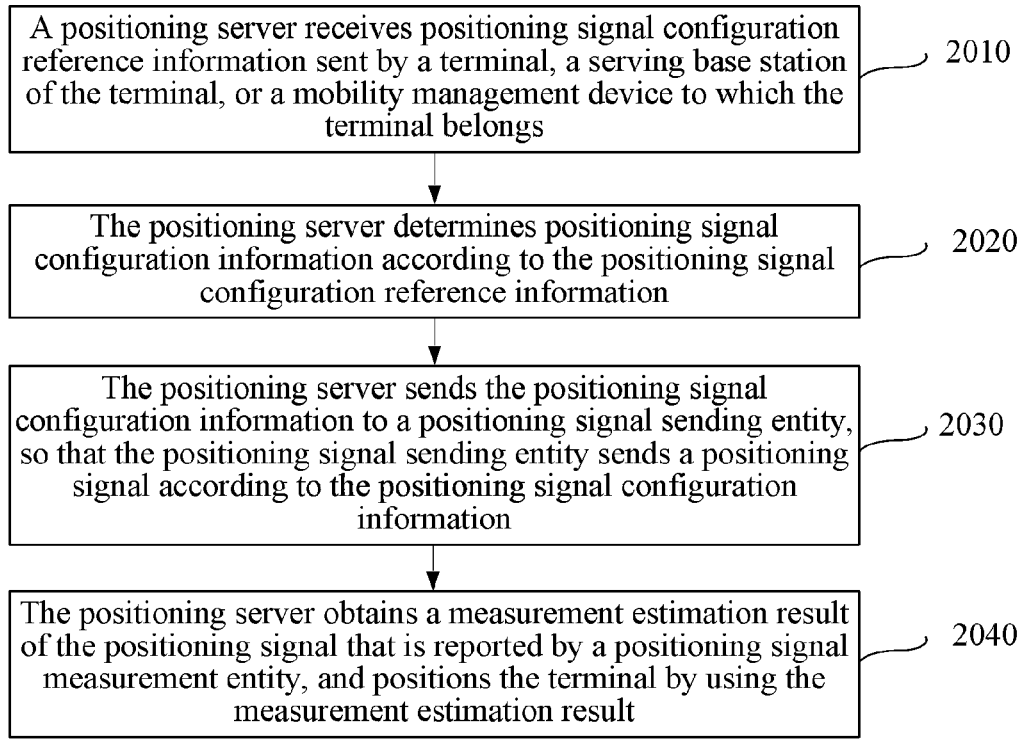
FIG. 20 is a flowchart of a positioning method according to another embodiment of the present invention.

An embodiment of the present invention provides a positioning method. As shown in FIG. 20, the method includes the following steps.

Step 2010: A positioning server receives positioning signal configuration reference information sent by a terminal, a serving base station of the terminal, or a mobility management device to which the terminal belongs, where the positioning signal configuration reference information includes one or more of the following: environment information, radio channel propagation information, and positioning signal configuration demand information of the terminal.

Step 2020: The positioning server determines positioning signal configuration information according to the positioning signal configuration reference information, where the positioning signal configuration information includes transmit power configuration information and/or resource configuration information of a positioning signal, and the resource configuration information includes time domain and/or frequency domain resource configuration information.

Step 2030: The positioning server sends the positioning signal configuration information to a positioning signal sending entity, so that the positioning signal sending entity sends a positioning signal according to the positioning signal configuration information, where the positioning signal is a positioning signal with positioning signal transmit power increased and/or resources added according to the positioning signal configuration information, and the resources include time domain and/or frequency domain resources.

Step 2040: The positioning server obtains a measurement estimation result of the positioning signal that is reported by a positioning signal measurement entity, and positions the terminal by using the measurement estimation result, where the terminal is one of the positioning signal measurement entity and the positioning signal sending entity.

In the foregoing embodiment, by adjusting the power and/or the resources of the positioning signal, the receiving quality of the positioning signal that arrives at a receive end is ensured, a propagation loss is effectively reduced, and the validity of the positioning signal sent by the positioning base station to the terminal is ensured, so that the number of cells that can participate in positioning is increased.

Figure 20A:
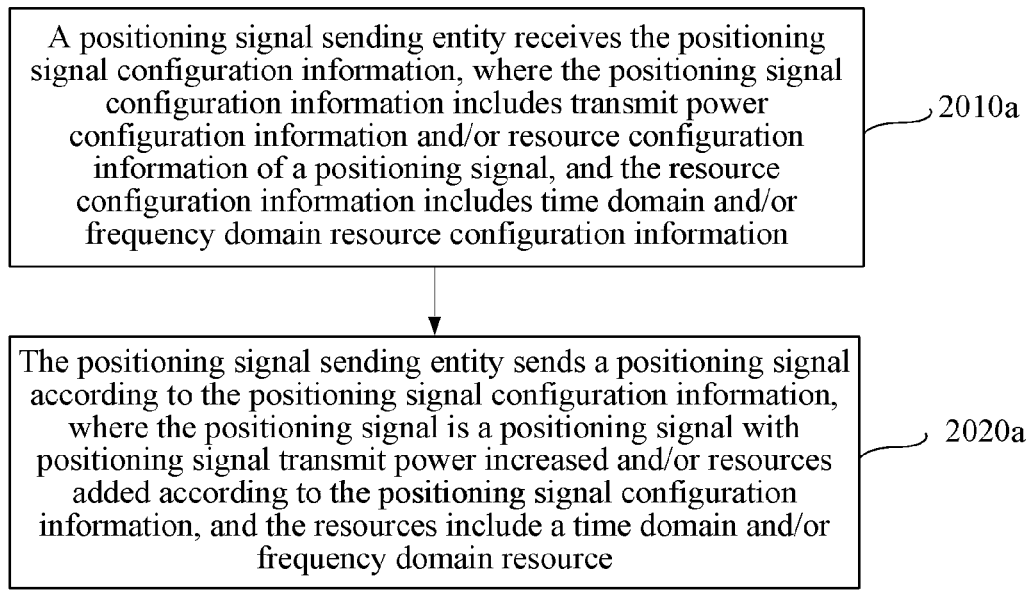
FIG. 20a is a flowchart of a positioning method according to another embodiment of the present invention.

An embodiment of the present invention provides a positioning signal sending method. As shown in FIG. 20a, the method includes the following steps.

Step 2010a: A positioning signal sending entity receives a positioning signal configuration information, where the positioning signal configuration information includes transmit power configuration information and/or resource configuration information of a positioning signal, and the resource configuration information includes time domain and/or frequency domain resource configuration information.

Step 2020a: The positioning signal sending entity sends a positioning signal according to the positioning signal configuration information, where the positioning signal is a positioning signal with positioning signal transmit power increased and/or resources added according to the positioning signal configuration information, and the resources include time domain and/or frequency domain resources.

In the foregoing embodiment, by adjusting the power and/or the resources of the positioning signal, the receiving quality of the positioning signal that arrives at a receive end is ensured, a propagation loss is effectively reduced, and the validity of the positioning signal sent by the positioning base station to the terminal is ensured, so that the number of cells that can participate in positioning is increased.

The foregoing two embodiments are further described in detail in the following.

Figure 21:
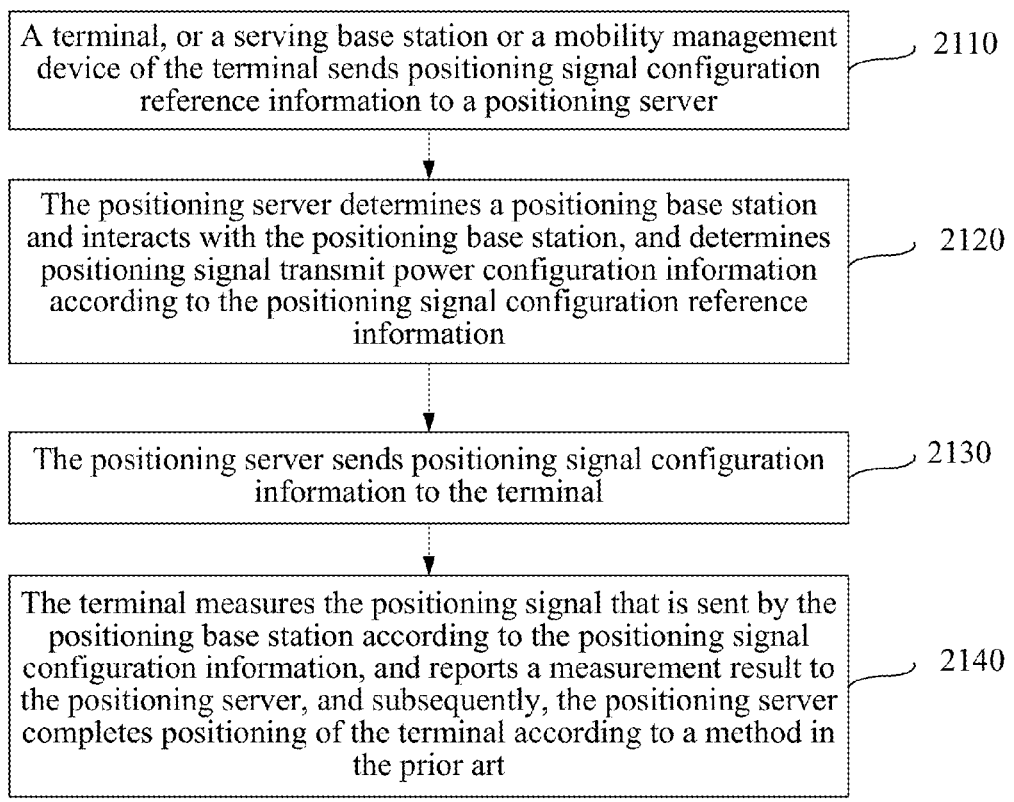
FIG. 21 is a flowchart of a positioning method according to another embodiment of the present invention.

Another embodiment of the present invention provides a positioning method, where the positioning method is an improved OTDOA positioning method. As shown in FIG. 21, the method includes the following steps.

Step 2110: A terminal, or a serving base station or a mobility management device of the terminal sends positioning signal configuration reference information to a positioning server, where the positioning signal configuration reference information includes one or more of the following: environment information, radio channel propagation information, and positioning signal configuration demand information of the terminal.

It should be noted that, this step is an optional step, and the positioning signal configuration reference information may not be sent to the positioning server; in this case, the positioning server may configure the positioning signal configuration reference information according to a preconfiguration when configuring a positioning signal. Further, in this embodiment, content being the same as that in the foregoing embodiments is not described again, and for detailed content, reference may be made to the descriptions in the foregoing embodiments.

Step 2120: The positioning server determines a positioning base station, and interacts with the positioning base station to determine transmit power configuration information of the positioning signal according to the positioning signal configuration reference information.

In this step, the positioning server determines needed transmit power of the positioning signal according to the positioning signal configuration reference information. For example, the current terminal sends a power boosting (PowerBoosting) demand, so that the positioning server requests the positioning base station to raise sending power of the positioning signal, and then the positioning base station increases the sending power of the positioning signal, and feeds positioning signal configuration information back to the positioning server, where the positioning signal configuration information may include the transmit power configuration information.

Step 2130: The positioning server sends the positioning signal configuration information to the terminal.

Step 2140: The terminal measures a positioning signal that is sent by the positioning base station according to the positioning signal configuration information, and reports a measurement result to the positioning server, and subsequently, the positioning server completes positioning of the terminal according to a method in the prior art.

In the foregoing embodiment, by adjusting the power, the receiving quality of the positioning signal that arrives at a receive end is ensured, a propagation loss is effectively resistedreduced, and the validity of the positioning signal sent by the positioning base station to the terminal is ensured, so that the number of cells that can participate in positioning is increased.

In this embodiment, for how the network elements interact with each other and for signaling used for interaction, reference may be made to the descriptions in the foregoing embodiments and application examples, and a difference lies in that, transmit power information of the positioning signal is involved in this embodiment, which will not be described herein again.

Figure 22:
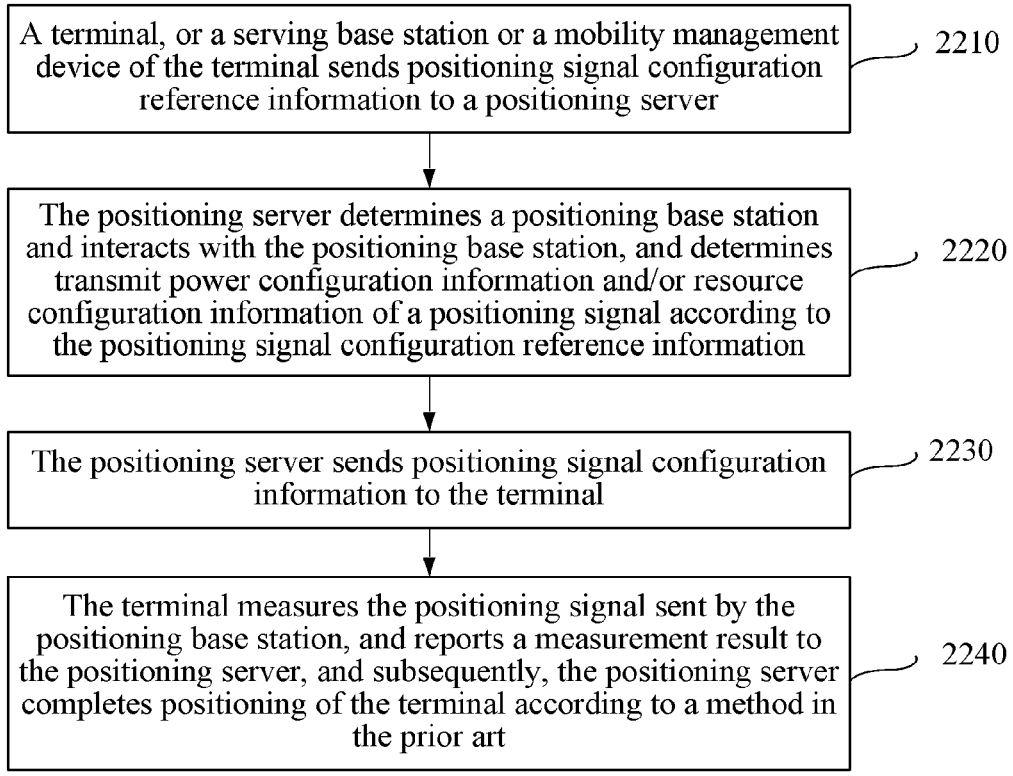
FIG. 22 is a flowchart of a positioning method according to another embodiment of the present invention.

An embodiment of the present invention provides a positioning method, where the positioning method is an improved OTDOA positioning method. As shown in FIG. 22, the method includes the following steps.

Step 2210: A terminal, or a serving base station or a mobility management device of the terminal sends positioning signal configuration reference information to a positioning server, where the positioning signal configuration reference information includes one or more of the following: environment information, radio channel propagation information, and positioning signal configuration demand information of the terminal.

It should be noted that, this step is an optional step, and the positioning signal configuration reference information may not be sent to the positioning server; in this case, the positioning server may configure the positioning signal configuration reference information according to a preconfiguration when configuring a positioning signal. Further, in this embodiment, content being the same as that in the foregoing is not described again, and for detailed content, reference may be made to the descriptions in the foregoing embodiments.

Further, a difference between this embodiment and the previous embodiment lies in that, the positioning signal configuration demand information of the terminal may be transmit power configuration demand information of a positioning signal of the terminal, may also be time domain and/or frequency domain resource configuration demand information of the positioning signal of the terminal, or may also be a combination of the two.

Step 2220: The positioning server determines a positioning base station, and interacts with the positioning base station to determine transmit power configuration information and/or resource configuration information of a positioning signal according to the positioning signal configuration reference information.

In this step, the positioning server determines needed transmit power of the positioning signal according to the positioning signal configuration reference information. For example, the current terminal sends a power boosting (PowerBoosting) demand, so that the positioning server requests the positioning base station to raise sending power of the positioning signal, and then the positioning base station increases the sending power of the positioning signal, and feeds positioning signal configuration information back to the positioning server, where the positioning signal configuration information may include the transmit power configuration information.

It may further be that, the positioning server determines a needed time domain and/or frequency domain resource of the positioning signal according to the positioning signal configuration reference information. For example, the current terminal sends a time domain and/or frequency domain resource demand, so that the positioning server requests the positioning base station to adjust the time domain and/or frequency domain resource of the positioning signal, and then, the positioning base station adjusts the time domain and/or frequency domain resource of the positioning signal, and feeds positioning signal configuration information back to the positioning server, where the positioning signal configuration information may include configuration information of the time domain and/or frequency domain resource.

Step 2230: The positioning server sends the positioning signal configuration information to the terminal.

Specifically, the positioning signal configuration information may include the transmit power configuration information and/or the resource configuration information, and a resource herein is a time domain and/or frequency domain resource.

It should be noted that, the positioning server may further configure the transmit power, and/or the time domain and/or frequency domain resource according to the received demand information, for example, if the demand information of the terminal indicates that higher transmit power is needed, after interacting with the positioning base station, the positioning server finds that power increasing greatly affects a neighboring cell and adds the time domain and/or frequency domain resource instead, so that the problem of poor receiving quality when the positioning signal arrives at a receive end is overcome. Otherwise, if the demand information of the terminal indicates that more time domain and/or frequency domain resources are needed, after interacting with the positioning base station, the positioning server finds that the time domain and/or frequency domain resources are insufficient and increases the transmit power instead, so that the problem of the poor receiving quality when the positioning signal arrives at the receive end is solved.

Step 2240: The terminal measures a positioning signal sent by the positioning base station, and reports a measurement result to the positioning server, and subsequently, the positioning server completes positioning of the terminal according to a method in the prior art.

In the foregoing embodiment, by adjusting the power and/or adding the time domain and/or frequency domain resource of the positioning signal, the receiving quality of the positioning signal that arrives at a receive end is ensured, a propagation loss is effectively resistedreduced, and the validity of the positioning signal sent by the positioning base station to the terminal is ensured, so that the number of cells that can participate in positioning is increased.

In this embodiment, for how the network elements interact with each other and for signaling used for interaction, reference may be made to the descriptions in the foregoing embodiments and application examples, and a difference lies in that, transmit power information of the positioning signal is involved in this embodiment, which is not described herein again.

Figure 23:
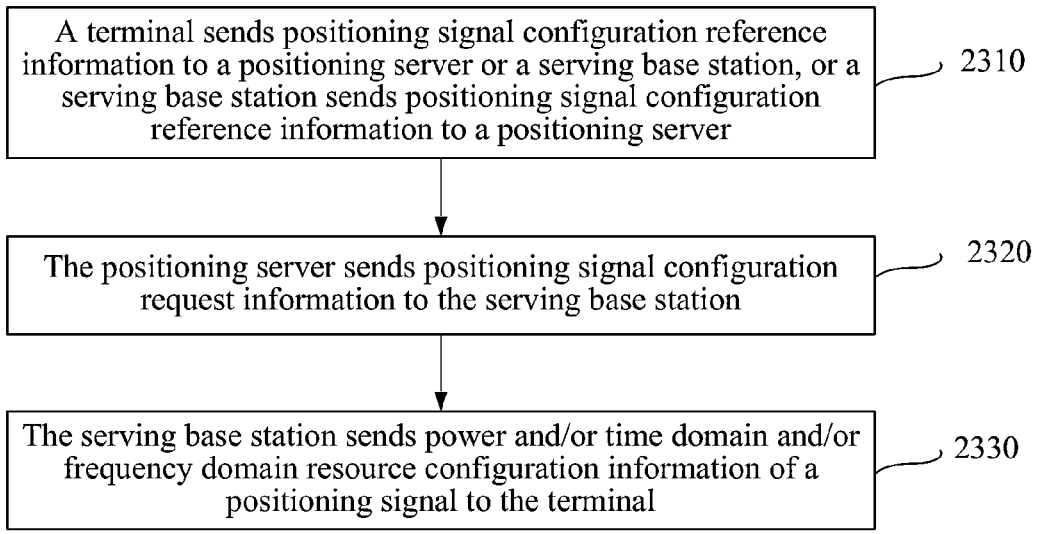
FIG. 23 is a flowchart of a positioning method according to another embodiment of the present invention.

Another embodiment of the present invention provides a positioning method, where the positioning method is an improved UTDOA positioning method. As shown in FIG. 23, the method includes the following steps.

Step 2310: A terminal sends positioning signal configuration reference information to a positioning server or a serving base station, or a serving base station sends positioning signal configuration reference information to a positioning server, where the positioning signal configuration reference information includes one or more of the following: environment information, radio channel propagation information, and positioning signal configuration demand information of the terminal.

In this embodiment, the positioning signal configuration demand information of the terminal may also be transmit power configuration demand information of a positioning signal of the terminal, may also be time domain and/or frequency domain resource configuration demand information of the positioning signal of the terminal, or may further be a combination of the two.

If the terminal sends the positioning signal configuration reference information to the positioning server or the serving base station in step 2310, step 2330 is directly performed.

Step 2320: The positioning server sends positioning signal configuration request information to the serving base station, where the positioning signal configuration request information in this embodiment is expected configuration power information and/or resource information of an uplink positioning signal that is determined by the positioning base station according to the positioning signal configuration reference information, and the resource information may be information of a time domain and/or frequency domain resource.

Step 2330: The serving base station sends power and/or resource configuration information of a positioning signal to the terminal.

For example, the serving base station determines, according to the received positioning signal configuration request information, transmit power of the uplink positioning signal sent by the terminal, and because the transmit power is increased, the serving base station sends information of the transmit power to the terminal. The time domain and/or frequency domain resource is similar to this.

It should be noted that, for example, if the demand information of the terminal indicates that higher transmit power is needed, after interacting with the positioning base station, the positioning server finds that power increasing greatly affects a neighboring cell and adds the time domain and/or frequency domain resource instead, so that the problem of poor receiving quality when the positioning signal arrives at a receive end is overcome. Otherwise, if the demand information of the terminal indicates that more time domain and/or frequency domain resources are needed, after interacting with the positioning base station, the positioning server finds that the time domain and/or frequency domain resources are insufficient and increases the transmit power instead, so that the problem of the poor receiving quality when the positioning signal arrives at the receive end is overcome.

For subsequent step 2340 to step 2380, reference may be made to the foregoing descriptions of the UTDOA, and a difference lies in that, in the foregoing embodiment, multiple paths exist between the positioning base station and the terminal or between the serving base station and the terminal, and in the foregoing embodiment, after obtaining the shortest transmission path, the positioning server positions the terminal according to the shortest transmission path. While, in this embodiment, an uplink positioning signal with power increased and/or a time domain and/or frequency domain resource added is measured, and the terminal is positioned according to a measurement result without obtaining the shortest transmission path.

It should be noted that, the embodiment of resisting the NLOS problem may be used in combination with resistance against the case in which the positioning accuracy is affected by the positioning signal strength loss and the SINR loss.

Figure 24:
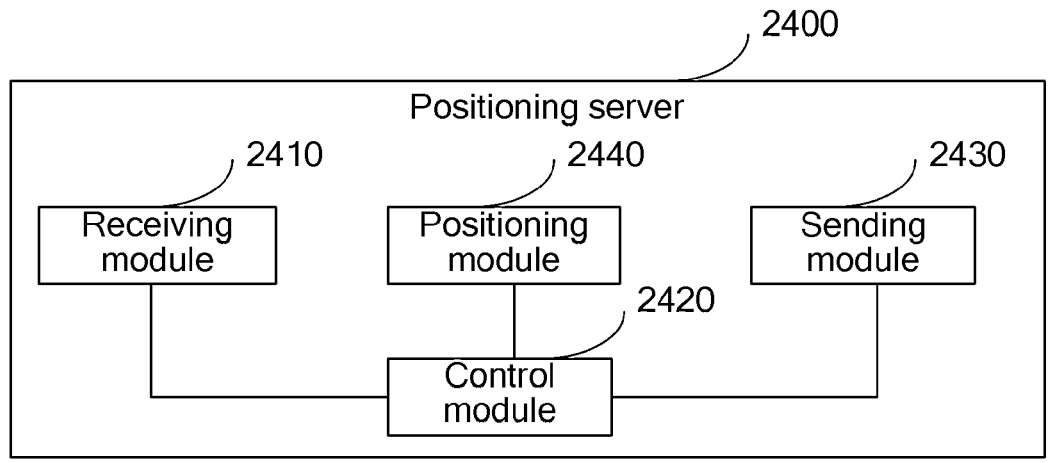
FIG. 24 is a schematic structural diagram of a positioning server according to an embodiment of the present invention.

For the foregoing method embodiment, an embodiment of the present invention provides a positioning server 2400. The positioning server 2400 in this embodiment can perform the steps in the method in the foregoing embodiment. Only the structure of the positioning server 2400 is briefly described in this embodiment, and for a specific implementation manner, reference may be made to the descriptions in the foregoing embodiment. As shown in FIG. 24, the positioning server 2400 in this embodiment includes a receiving module 2410, a control module 2420, a sending module 2430, and a positioning module 2440, where the control module 2420 is configured to determine positioning signal configuration information, and obtain a measurement estimation result of a shortest transmission path between a positioning signal measurement entity and a positioning signal sending entity;

the sending module 2430 is configured to send the positioning signal configuration information determined by the control module 2420 to the positioning signal sending entity; and the positioning module 2440 is configured to position a terminal by using the measurement estimation result of the shortest transmission path that is obtained by the control module 2420, where the terminal is one of the positioning signal measurement entity and the positioning signal sending entity.

In the foregoing embodiment, the positioning server positions the terminal by using the shortest transmission path; and because the shortest transmission path is closest to an LOS path, although paths through which the positioning signals measured by the positioning signal measurement entity pass may all be NLOS paths, in the solutions in this embodiment, the shortest transmission path can still be selected for positioning the terminal, so that a positioning error can be effectively controlled, and the positioning accuracy is effectively improved for the NLOS path deviation.

Further, the control module 2420 is specifically configured to determine the positioning signal configuration information in the following manner: determining the positioning signal configuration information according to preconfigured positioning signal configuration reference information; and the positioning server further includes a storage module, configured to store the preconfigured positioning signal configuration reference information;

or the receiving module 2410 is configured to receive positioning signal configuration reference information sent by the terminal, a serving base station of the terminal, or a mobility management device to which the terminal belongs; and the control module 2420 is specifically configured to determine the positioning signal configuration information in the following manner: determining the positioning signal configuration information according to the positioning signal configuration reference information, where the positioning signal configuration reference information includes one or more of the following: environment information, radio channel propagation information, and positioning signal configuration demand information of the terminal.

Further, the control module 2420 is specifically configured to determine the positioning signal configuration information in the following manner:

controlling the sending module 2430 to send positioning signal configuration request information to the serving base station of the terminal, where the positioning signal configuration request information includes the positioning signal configuration reference information and/or expected configuration information, and the expected configuration information is expected positioning signal configuration information that is determined by the positioning server according to the positioning signal configuration reference information; and receiving, by using the receiving module 2410, the positioning signal configuration information that is determined by the serving base station according to the positioning signal configuration request information.

Further, the receiving module 2410 is specifically configured to receive, in the following manner, the positioning signal configuration reference information sent by the terminal: receiving, by using Long Term Evolution positioning protocol LPP signaling, the positioning signal configuration reference information sent by the terminal.

Further, the receiving module 2410 is specifically configured to receive, by using the LPP signaling in the following manner, the positioning signal configuration reference information sent by the terminal:

receiving, by using assistance data request signaling, the positioning signal configuration reference information sent by the terminal; or receiving, by using terminal positioning capability signaling, the positioning signal configuration reference information sent by the terminal.

Further, the receiving module 2410 is specifically configured to receive, in the following manner, the positioning signal configuration reference information sent by the terminal: receiving, by using Long Term Evolution positioning protocol a LPPa signaling, the positioning signal configuration reference information sent by the serving base station.

Further, the receiving module 2410 is specifically configured to receive, by using the LPPa signaling in the following manner, the positioning signal configuration reference information sent by the serving base station:

receiving, by using assistance data feedback signaling, the positioning signal configuration reference information sent by the serving base station.

Further, the positioning signal configuration information determined by the control module 2420 includes: information of multiple carriers corresponding to multiple positioning signals, and/or information of multiple radio access technologies corresponding to multiple positioning signals.

Further, the control module 2420 is specifically configured to obtain the measurement estimation result of the shortest transmission path between the positioning signal measurement entity and the positioning signal sending entity in the following manner:

receiving, by using the receiving module 2410, measurement estimation results that are obtained after the positioning signal measurement entity separately measures the multiple positioning signals, and determining, by the control module 2420, a positioning signal that has the shortest transmission path in the multiple positioning signals according to the measurement estimation results of the multiple positioning signals, and obtaining the measurement estimation result of the shortest transmission path; or receiving, by using the receiving module 2410, a measurement result of the shortest transmission path that is sent by the positioning signal measurement entity, where the measurement result of the shortest transmission path is determined, after the positioning signal measurement entity separately measures multiple positioning signals, by the positioning signal measurement entity according to measurement results of the multiple positioning signals.

Further, the control module 2420 is specifically configured to obtain the measurement estimation result of the shortest transmission path between the positioning signal measurement entity and the positioning signal sending entity in the following manner:

receiving, by using the receiving module 2410, at least two measurement estimation results that are obtained after the positioning signal measurement entity measures one positioning signal by using at least two measurement manners, and determining, by the control module 2420, the shortest transmission path between the positioning signal measurement entity and the positioning signal sending entity according to the at least two measurement estimation results, and obtaining the measurement estimation result of the shortest transmission path; or receiving, by using the receiving module 2410, the measurement estimation result of the shortest transmission path that is sent by the positioning signal measurement entity, where the measurement estimation result of the shortest transmission path is determined by the positioning signal measurement entity according to at least two measurement results, and the at least two measurement results are obtained by the positioning signal measurement entity by measuring, by using at least two measurement manners, one positioning signal sent by the positioning signal sending entity.

This embodiment is an apparatus embodiment corresponding to the foregoing method embodiment, the effects thereof are the same as those in the foregoing method embodiment, and for details, reference may be made to the foregoing descriptions, which is not described herein again. In addition, for specific steps performed by each module, reference may be made to the descriptions in the foregoing method embodiment.

Figure 25:
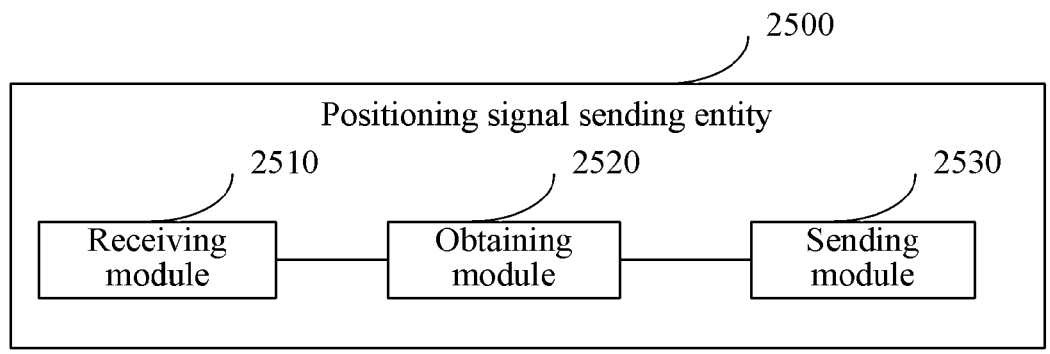
FIG. 25 is a schematic structural diagram of a positioning signal sending entity according to an embodiment of the present invention.

For the foregoing method embodiment, an embodiment of the present invention provides a positioning signal sending entity 2500. The positioning signal sending entity 2500 in this embodiment can perform the steps in the method in the foregoing embodiment. Only the structure of the positioning signal sending entity 2500 is briefly described in this embodiment, and for a specific implementation manner, reference may be made to the descriptions in the foregoing embodiments. As shown in FIG. 25, the positioning signal sending entity 2500 in this embodiment includes a receiving module 2510, an obtaining module 2520, and a sending module 2530, where the obtaining module 2520 is configured to obtain positioning signal configuration information; and the sending module 2530 is configured to send a corresponding positioning signal to a positioning signal measurement entity according to the positioning signal configuration information obtained by the obtaining module 2520, so that, after the positioning signal measurement entity measures the positioning signal, a positioning server obtains a measurement estimation result of a shortest transmission path between the positioning signal measurement entity and the positioning signal sending entity, and the positioning server positions a terminal by using the measurement estimation result of the shortest transmission path, where the terminal is one of the positioning signal measurement entity and the positioning signal sending entity.

This embodiment is an apparatus embodiment corresponding to the foregoing method embodiment, the effects thereof are the same as those in the foregoing method embodiment, and for details, reference may be made to the foregoing descriptions, which is not described herein again. In addition, for specific steps performed by each module, reference may be made to the descriptions in the foregoing method embodiment.

Further, the obtaining module 2520 is specifically configured to obtain the positioning signal configuration information in the following manner:

receiving, by using the receiving module 2510, the positioning signal configuration information determined by the positioning server; or sending positioning signal configuration reference information to the positioning server by using the sending module 2530, and receiving, by using the receiving module 2510, the positioning signal configuration information that is sent by the positioning server to the positioning signal sending entity after the positioning server determines the positioning signal configuration information according to the positioning signal configuration reference information; or receiving, by using the receiving module 2510, positioning signal configuration reference information sent by the terminal, and determining the positioning signal configuration information according to the positioning signal configuration reference information, where the positioning signal configuration reference information includes one or more of the following: environment information, radio channel propagation information, and positioning signal configuration demand information of the terminal.

Further, the receiving module 2510 is specifically configured to receive, in the following manner, the positioning signal configuration reference information sent by the terminal: receiving, by using radio resource control RRC signaling or Long Term Evolution positioning protocol LPP signaling, the positioning signal configuration reference information sent by the terminal.

Further, the receiving module 2510 is specifically configured to receive, by using the RRC signaling in the following manner, the positioning signal configuration reference information sent by the terminal: receiving, by using RRC connection signaling, the positioning signal configuration reference information sent by the terminal; or the receiving module 2510 is specifically configured to receive, by using the LPP signaling in the following manner, the positioning signal configuration reference information sent by the terminal: receiving, by using provide positioning capability signaling, the positioning signal configuration reference information sent by the terminal; or receiving, by using enhanced cell identifier-provide positioning capability signaling, the positioning signal configuration reference information sent by the terminal.

Further, the positioning signal sending entity may be a positioning base station.

Further, the positioning signal sending entity may be a serving base station.

The sending module 2530 is further configured to send the positioning signal configuration reference information to the positioning server, where the positioning signal configuration reference information includes one or more of the following: environment information, radio channel propagation information, and positioning signal configuration demand information of the terminal. Further, the sending module 2530 is specifically configured to send the positioning signal configuration reference information to the positioning server in the following manner: receiving, by using Long Term Evolution positioning protocol a LPPa signaling, the positioning signal configuration reference information sent by the serving base station. Further, the sending module is specifically configured to receive, by using the Long Term Evolution positioning protocol a LPPa signaling in the following manner, the positioning signal configuration reference information sent by the serving base station: receiving, by using assistance data feedback signaling, the positioning signal configuration reference information sent by the serving base station.

Further, the positioning signal configuration demand information received by the receiving module 2510 is a current demand indication of multicarrier positioning signals of the terminal and/or a current demand indication of multi-radio access technology positioning signals of the terminal.

Further, the positioning signal sending entity may be a serving base station; and the obtaining module 2520 is specifically configured to obtain the positioning signal configuration information in the following manner:

receiving, by using the receiving module 2510, positioning signal configuration request information sent by the positioning server, and determining the positioning signal configuration information according to the positioning signal configuration request information, where the positioning signal configuration request information includes the positioning signal configuration reference information and/or expected configuration information, the expected configuration information is determined by the positioning server according to the positioning signal configuration reference information, and the positioning signal configuration reference information is sent by the serving base station, the terminal, or a mobility management entity of the terminal to the positioning server; or determining the positioning signal configuration information according to the obtained positioning signal configuration reference information.

Further, after obtaining the positioning signal configuration information, the obtaining module 2520 is further configured to send the positioning signal configuration information to the positioning server by using the sending module, so that the positioning server sends the positioning signal configuration information to a positioning base station except the serving base station.

Further, the positioning signal configuration information obtained by the obtaining module 2520 includes: information of multiple carriers corresponding to multiple positioning signals, and/or information of multiple radio access technologies corresponding to multiple positioning signals.

Figure 26:
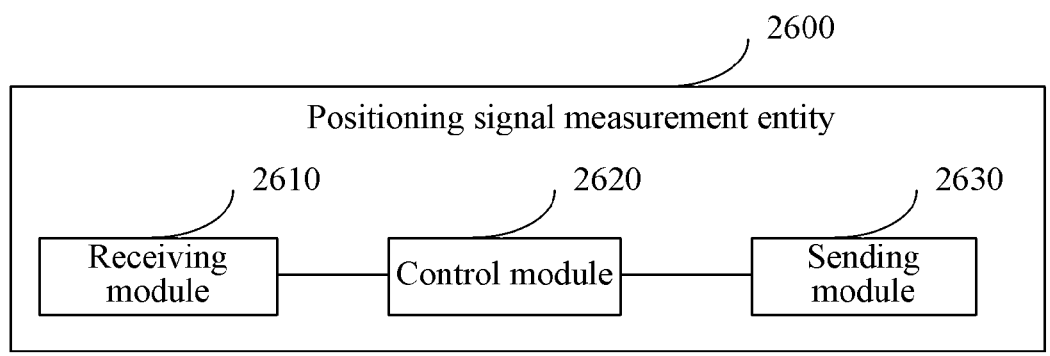
FIG. 26 is a schematic structural diagram of a positioning signal measurement entity according to an embodiment of the present invention.

For the foregoing method embodiment, an embodiment of the present invention provides a positioning signal measurement entity 2600. The positioning signal measurement entity 2600 in this embodiment can perform the steps in the method in the foregoing embodiment. Only the structure of the positioning signal measurement entity 2600 is briefly described in this embodiment, and for a specific implementation manner, reference may be made to the descriptions in the foregoing embodiment. As shown in FIG. 26, the positioning signal measurement entity 2600 in this embodiment includes a receiving module 2610, a control module 2620, and a sending module 2630, where the receiving module 2610 is configured to receive positioning signal configuration information sent by a positioning server, and receive positioning signals according to the positioning signal configuration information; and the control module 2620 is configured to measure the positioning signals received by the receiving module 2610, to obtain multiple measurement results of the positioning signals between the positioning signal measurement entity and a positioning signal sending entity, and obtain measurement estimation results of the multiple measurement results; and the sending module 2630 is configured to send the multiple measurement estimation results obtained by the control module 2620 to the positioning server, so that the positioning server determines a measurement estimation result of a shortest transmission path between the positioning signal measurement entity and the positioning signal sending entity according to the multiple measurement estimation results, and positions a terminal by using the measurement estimation result of the shortest transmission path; or the control module 2620 is configured to measure the positioning signals received by the receiving module 2610, to obtain multiple measurement results of the positioning signals between the positioning signal measurement entity and a positioning signal sending entity, and determine a measurement estimation result of a shortest transmission path between the positioning signal measurement entity and the positioning signal sending entity in multiple measurement estimation results corresponding to the multiple measurement results; and the sending module 2630 is configured to send the measurement estimation result of the shortest transmission path that is determined by the control module 2620 to the positioning server, so that the positioning server positions a terminal by using the measurement estimation result of the shortest transmission path, where the terminal is one of the positioning signal measurement entity and the positioning signal sending entity, and the measurement estimation result is the measurement result or an estimation result derived according to the measurement result.

This embodiment is an apparatus embodiment corresponding to the foregoing method embodiment, the effects thereof are the same as those in the foregoing method embodiment, and for details, reference may be made to the foregoing descriptions, which is not described herein again. In addition, for specific steps performed by each module, reference may be made to the descriptions in the foregoing method embodiment.

Further, the control module 2620 is further configured to: before receiving, by using the receiving module 2610, the positioning signal configuration information sent by the positioning server, send, by using the sending module 2630, positioning signal configuration reference information to the positioning server, so that the positioning server determines the positioning signal configuration information according to the positioning signal configuration reference information, where the positioning signal configuration reference information includes one or more of the following: environment information, radio channel propagation information, and positioning signal configuration demand information of the terminal.

Further, the positioning signal measurement entity is the terminal; and the sending module 2630 is specifically configured to send the positioning signal configuration reference information to the positioning server in the following manner: sending the positioning signal configuration reference information to the positioning server by using Long Term Evolution positioning protocol LPP signaling.

Further, the sending module 2630 is specifically configured to send the positioning signal configuration reference information to the positioning server by using the LPP signaling in the following manner:

sending the positioning signal configuration reference information to the positioning server by using assistance data request signaling; or sending the positioning signal configuration reference information to the positioning server by using terminal positioning capability signaling.

Further, the control module 2620 is specifically configured to measure, in the following manner, the positioning signals received by the receiving module 2610, to obtain the multiple measurement results of the positioning signals between the positioning signal measurement entity and the positioning signal sending entity: separately measuring multiple positioning signals sent by one positioning signal sending entity, to obtain the measurement results corresponding to the multiple positioning signals.

Further, the control module 2620 is specifically configured to measure, in the following manner, the positioning signals received by the receiving module 2610, to obtain the multiple measurement results of the positioning signals between the positioning signal measurement entity and the positioning signal sending entity: obtaining at least two measurement results of one positioning signal after measuring the one positioning signal by using at least two measurement manners.

Figure 27:
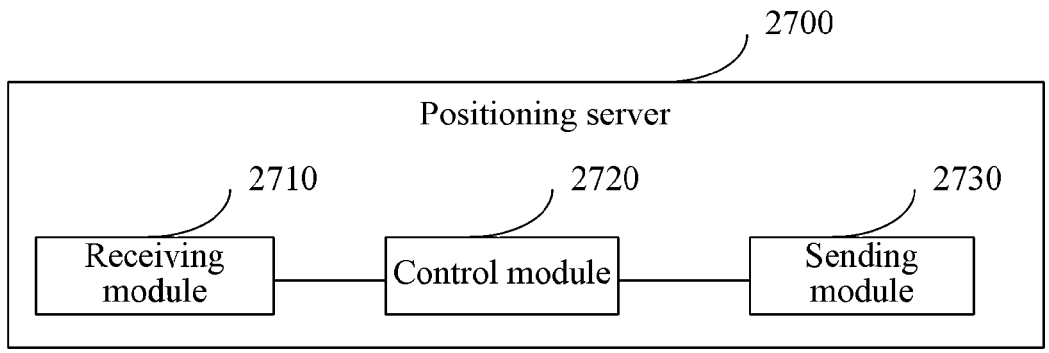
FIG. 27 is a schematic structural diagram of a positioning server according to another embodiment of the present invention.

For the foregoing method embodiment, an embodiment of the present invention provides a positioning server 2700. The positioning server 2700 in this embodiment can perform the steps in the method in the foregoing embodiment. Only the structure of the positioning server 2700 is briefly described in this embodiment, and for a specific implementation manner, reference may be made to the descriptions in the foregoing embodiment. As shown in FIG. 27, the positioning server 2700 in this embodiment includes a receiving module 2710, a control module 2720, and a sending module 2730, where the receiving module 2710 is configured to receive positioning signal configuration reference information sent by a terminal, a serving base station of the terminal, or a mobility management device to which the terminal belongs, and obtain a measurement estimation result of a positioning signal that is reported by a positioning signal measurement entity, where the positioning signal configuration reference information includes one or more of the following: environment information, radio channel propagation information, and positioning signal configuration demand information of the terminal;

the control module 2720 is configured to determine positioning signal configuration information according to the positioning signal configuration reference information received by the receiving module 2710, and position the terminal by using the measurement estimation result obtained by the receiving module 2710, where the positioning signal configuration information includes transmit power configuration information and/or resource configuration information of a positioning signal, and the resource configuration information includes time domain and/or frequency domain resource configuration information; and the sending module 2730 is configured to send the positioning signal configuration information to a positioning signal sending entity, so that the positioning signal sending entity sends the positioning signal according to the positioning signal configuration information, where the positioning signal is a positioning signal with positioning signal transmit power increased and/or resources added according to the positioning signal configuration information, the resources include time domain and/or frequency domain resources, and the terminal is one of the positioning signal measurement entity and the positioning signal sending entity.

This embodiment is an apparatus embodiment corresponding to the foregoing method embodiment, the effects thereof are the same as those in the foregoing method embodiment, and for details, reference may be made to the foregoing descriptions, which will not be described herein again. In addition, for specific steps performed by each module, reference may be made to the descriptions in the foregoing method embodiment.

Further, the receiving module 2710 is specifically configured to receive, in the following manner, the positioning signal configuration reference information sent by the terminal: receiving, by using Long Term Evolution positioning protocol LPP signaling, the positioning signal configuration reference information sent by the terminal.

Further, the receiving module 2710 is specifically configured to receive, by using the LPP signaling in the following manner, the positioning signal configuration reference information sent by the terminal:

receiving, by using assistance data request signaling, the positioning signal configuration reference information sent by the terminal; or receiving, by using terminal positioning capability signaling, the positioning signal configuration reference information sent by the terminal.

Figure 28:
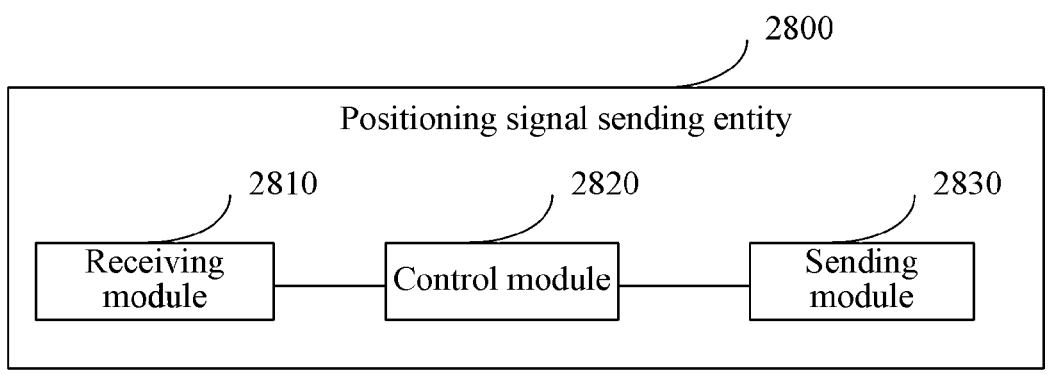
FIG. 28 is a schematic structural diagram of a positioning signal sending entity according to another embodiment of the present invention.

For the foregoing method embodiment, an embodiment of the present invention provides a positioning signal sending entity 2800. The positioning signal sending entity 2800 in this embodiment can perform the steps in the method in the foregoing embodiment. Only the structure of the positioning signal sending entity 2800 is briefly described in this embodiment, and for a specific implementation manner, reference may be made to the descriptions in the foregoing embodiment. As shown in FIG. 28, the positioning signal sending entity 2800 in this embodiment includes a receiving module 2810, a control module 2820, and a sending module 2830, where the receiving module 2810 is configured to receive a positioning signal configuration information, where the positioning signal configuration information includes transmit power configuration information and/or resource configuration information of a positioning signal, and the resource configuration information includes time domain and/or frequency domain resource configuration information; and the control module 2820 is configured to control, according to the positioning signal configuration information received by the receiving module 2810, the sending module 2830 to send a positioning signal, so that a positioning signal measurement entity measures the positioning signal and reports a measurement result to a positioning server, and further, the positioning server positions a terminal according to the measurement result, where the positioning signal is a positioning signal with positioning signal transmit power increased and/or resources added according to the positioning signal configuration information, the resources include time domain and/or frequency domain resources, and the terminal is one of the positioning signal measurement entity and the positioning signal sending entity.

This embodiment is an apparatus embodiment corresponding to the foregoing method embodiment, the effects thereof are the same as those in the foregoing method embodiment, and for details, reference may be made to the foregoing descriptions, which will not be described herein again. In addition, for specific steps performed by each module, reference may be made to the descriptions in the foregoing method embodiment.

Further, the sending module 2830 is further configured to send positioning signal configuration reference information to the positioning server, so that the positioning server determines the positioning signal configuration information according to the positioning signal configuration reference information, where the positioning signal configuration reference information includes one or more of the following: environment information, radio channel propagation information, and positioning signal configuration demand information of the terminal.

Further, the positioning signal sending entity is the terminal; and the sending module 2830 is specifically configured to send the positioning signal configuration reference information to the positioning server in the following manner:

sending, by the terminal, the positioning signal configuration reference information to the positioning server by using Long Term Evolution positioning protocol LPP signaling.

Further, the sending module 2830 is specifically configured to send the positioning signal configuration reference information to the positioning server by using the LPP signaling in the following manner:

sending the positioning signal configuration reference information to the positioning server by using assistance data request signaling; or sending the positioning signal configuration reference information to the positioning server by using terminal positioning capability signaling.

It should be noted that, the positioning server, the positioning signal sending entity, and the positioning signal measurement entity in the foregoing embodiments can be configured to implement any method provided in the foregoing method embodiments, and descriptions of each term are the same as those in the foregoing method embodiments, which is not described herein again.

Embodiments of the present invention further provide apparatus embodiments for implementing the steps and the methods in the foregoing method embodiments. The embodiments of the present invention are applicable to various communications systems.

Figure 29:
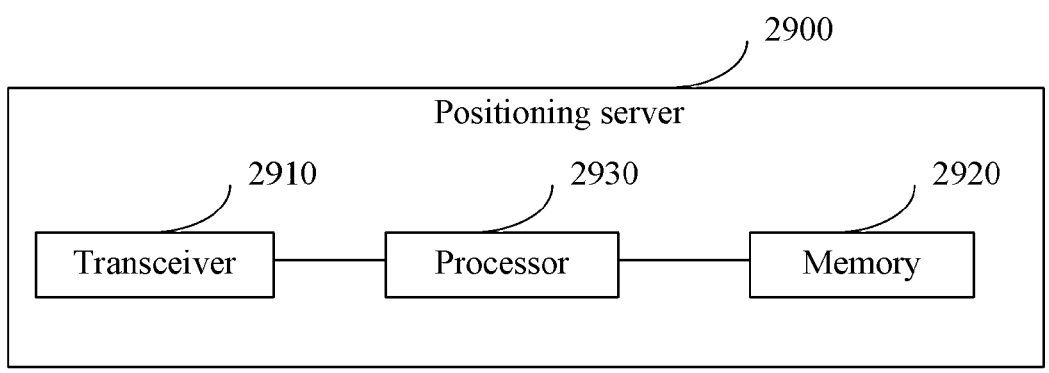
FIG. 29 is a schematic structural diagram of a positioning server according to another embodiment of the present invention.

Referring to FIG. 29, FIG. 29 is a schematic structural diagram of a positioning server 2900 according to an embodiment of the present invention. As shown in the figure, the positioning server includes a transceiver 2910, a memory 2920, and a processor 2930 coupled with the transceiver 2910 and the memory 2920. Certainly, the positioning server may further include a universal component such as a baseband processing component, an intermediate radio frequency processing component, or an input/output apparatus, which is not be limited in the embodiment of the present invention.

The memory 2920 is configured to store program code; and the processor 2930 is coupled with the memory 2920, and is configured to invoke the program code stored in the memory 2920 to perform the following operations:

determining positioning signal configuration information;

sending the positioning signal configuration information to a positioning signal sending entity by using the transceiver 2910;

obtaining a measurement estimation result of a shortest transmission path between a positioning signal measurement entity and the positioning signal sending entity; and positioning the terminal by using the measurement estimation result of the shortest transmission path, where the terminal is one of the positioning signal measurement entity and the positioning signal sending entity.

This embodiment is an apparatus embodiment corresponding to the foregoing method embodiment, the effects thereof are the same as those in the foregoing method embodiment, and for details, reference may be made to the foregoing descriptions in the above, which will not be described herein again. In addition, for specific steps performed by each module, reference may be made to the descriptions in the foregoing method embodiment.

Further, the processor 2930 is specifically configured to determine the positioning signal configuration information in the following manner: determining the positioning signal configuration information according to preconfigured positioning signal configuration reference information; and the memory 2920 is further configured to store the preconfigured positioning signal configuration reference information;
or the processor 2930 is specifically configured to determine the positioning signal configuration information in the following manner: determining the positioning signal configuration information according to the positioning signal configuration reference information received by the transceiver 2910, where the positioning signal configuration reference information is sent by the terminal, a serving base station of the terminal, or a mobility management device to which the terminal belongs, where the positioning signal configuration reference information includes one or more of the following: environment information, radio channel propagation information, and positioning signal configuration demand information of the terminal.

Further, in the positioning signal configuration reference information received by the transceiver 2910, the positioning signal configuration demand information of the terminal is a current demand indication of multicarrier positioning signals of the terminal and/or a current demand indication of multi-radio access technology positioning signals of the terminal.

Further, the processor 2930 is specifically configured to obtain the measurement result of the shortest transmission path between the positioning signal measurement entity and the positioning signal sending entity in the following manner:

controlling the transceiver 2910 to send positioning signal configuration request information to the serving base station of the terminal, where the positioning signal configuration request information includes the positioning signal configuration reference information and/or expected configuration information, and the expected configuration information is expected positioning signal configuration information that is determined by the positioning server according to the positioning signal configuration reference information; and receiving, by using the transceiver 2910, the positioning signal configuration information that is determined by the serving base station according to the positioning signal configuration request information.

Further, the transceiver 2910 is specifically configured to receive, in the following manner, the positioning signal configuration reference information sent by the terminal: receiving, by using Long Term Evolution positioning protocol LPP signaling, the positioning signal configuration reference information sent by the terminal.

Further, the transceiver 2910 is specifically configured to receive, by using the LPP signaling in the following manner, the positioning signal configuration reference information sent by the terminal:

receiving, by using assistance data request signaling, the positioning signal configuration reference information sent by the terminal; or receiving, by using terminal positioning capability signaling, the positioning signal configuration reference information sent by the terminal.

Further, the transceiver 2910 is specifically configured to receive, in the following manner, the positioning signal configuration reference information sent by the serving base station: receiving, by using Long Term Evolution positioning protocol a LPPa signaling, the positioning signal configuration reference information sent by the serving base station.

Further, the transceiver 2910 is specifically configured to receive, by using the LPPa signaling in the following manner, the positioning signal configuration reference information sent by the serving base station:

receiving, by using assistance data feedback signaling, the positioning signal configuration reference information sent by the serving base station.

Further, the positioning signal configuration information determined by the processor 2930 includes: information of multiple carriers corresponding to multiple positioning signals, and/or information of multiple radio access technologies corresponding to multiple positioning signals.

Further, the processor 2930 is specifically configured to obtain the measurement estimation result of the shortest transmission path between the positioning signal measurement entity and the positioning signal sending entity in the following manner:

receiving, by using the transceiver 2910, measurement estimation results that are obtained after the positioning signal measurement entity separately measures the multiple positioning signals, and determining a positioning signal that has the shortest transmission path in the multiple positioning signals according to the measurement estimation results of the multiple positioning signals, and obtaining the measurement estimation result of the shortest transmission path; or receiving, by using the transceiver 2910, the measurement estimation result of the shortest transmission path that is sent by the positioning signal measurement entity, where the measurement estimation result of the shortest transmission path is determined, after the positioning signal measurement entity separately measures the multiple positioning signals, by the positioning signal measurement entity according to measurement results of the multiple positioning signals.

Further, the processor 2930 is specifically configured to obtain the measurement estimation result of the shortest transmission path between the positioning signal measurement entity and the positioning signal sending entity in the following manner:

receiving, by using the transceiver 2910, at least two measurement estimation results that are obtained after the positioning signal measurement entity measures one positioning signal by using at least two measurement manners, and determining the shortest transmission path between the positioning signal measurement entity and the positioning signal sending entity according to the at least two measurement estimation results, and obtaining the measurement estimation result of the shortest transmission path; or receiving, by using the transceiver 2910, the measurement estimation result of the shortest transmission path that is sent by the positioning signal measurement entity, where the measurement estimation result of the shortest transmission path is determined by the positioning signal measurement entity according to at least two measurement results, and the at least two measurement results are obtained by the positioning signal measurement entity by measuring, by using at least two measurement manners, one positioning signal sent by the positioning signal sending entity.

Figure 30:
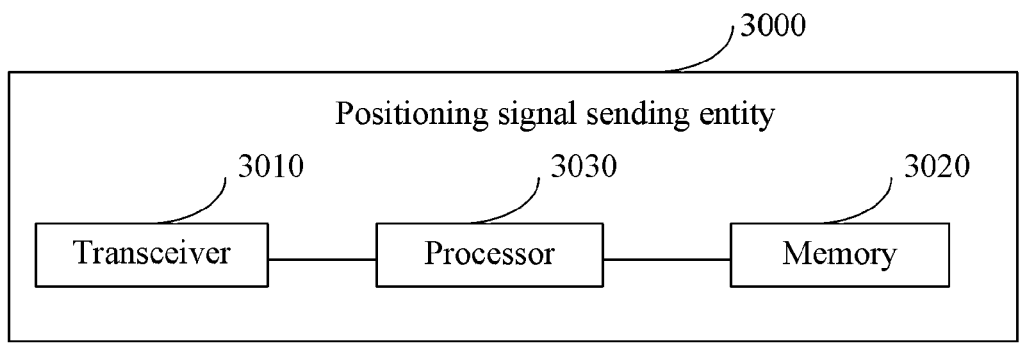
FIG. 30 is a schematic structural diagram of a positioning signal sending entity according to another embodiment of the present invention.

Referring to FIG. 30, FIG. 30 is a schematic structural diagram of a positioning signal sending entity 3000 according to an embodiment of the present invention. As shown in the figure, the positioning signal sending entity 3000 includes a transceiver 3010, a memory 3020, and a processor 3030 coupled with the transceiver 3010 and the memory 3020. Certainly, the positioning signal sending entity 3000 may further include a universal component such as a baseband processing component, an intermediate radio frequency processing component, or an input/output apparatus, which is not limited in the embodiment of the present invention.

The memory 3020 is configured to store a set of program code; and the processor 3030 is coupled with the memory 3020, and is configured to invoke the program code stored in the memory 3020 to perform the following operations:

obtaining positioning signal configuration information; and sending a corresponding positioning signal to the positioning signal measurement entity by using the transceiver 3010 according to the positioning signal configuration information, so that, after the positioning signal measurement entity measures the positioning signal, a positioning server obtains a measurement estimation result of a shortest transmission path between the positioning signal measurement entity and the positioning signal sending entity, and the positioning server positions a terminal by using the measurement estimation result of the shortest transmission path, where the terminal is one of the positioning signal measurement entity and the positioning signal sending entity.

This embodiment is an apparatus embodiment corresponding to the foregoing method embodiment, the effects thereof are the same as those in the foregoing method embodiment, and for details, reference may be made to the foregoing descriptions, which is not described herein again. In addition, for specific steps performed by each module, reference may be made to the descriptions in the foregoing method embodiment.

Further, the processor 3030 is specifically configured to obtain the positioning signal configuration information in the following manner:

receiving, by using the transceiver 3010, the positioning signal configuration information determined by the positioning server; or sending positioning signal configuration reference information to the positioning server by using the transceiver 3010, and receiving, by using the transceiver 3010, the positioning signal configuration information that is sent by the positioning server to the positioning signal sending entity after the positioning server determines the positioning signal configuration information according to the positioning signal configuration reference information; or receiving, by using the transceiver 3010, positioning signal configuration reference information sent by the terminal, and determining the positioning signal configuration information according to the positioning signal configuration reference information, where the positioning signal configuration reference information includes one or more of the following: environment information, radio channel propagation information, and positioning signal configuration demand information of the terminal.

Further, the transceiver 3010 is specifically configured to receive, in the following manner, the positioning signal configuration reference information sent by the terminal, receiving, by using radio resource control RRC signaling or Long Term Evolution positioning protocol LPP signaling, the positioning signal configuration reference information sent by the terminal.

Further, the transceiver 3010 is specifically configured to receive, by using the RRC signaling in the following manner, the positioning signal configuration reference information sent by the terminal: receiving, by using RRC connection signaling, the positioning signal configuration reference information sent by the terminal; or the transceiver 3010 is specifically configured to receive, by using the LPP signaling in the following manner, the positioning signal configuration reference information sent by the terminal: receiving, by using provide positioning capability signaling, the positioning signal configuration reference information sent by the terminal; or receiving, by using enhanced cell identifier-provide positioning capability signaling, the positioning signal configuration reference information sent by the terminal.

Further, the positioning signal sending entity may be a positioning base station.

Further, the positioning signal sending entity may be a serving base station; and the transceiver 3010 is further configured to send positioning signal configuration reference information to the positioning server, where the positioning signal configuration reference information includes one or more of the following: environment information, radio channel propagation information, and positioning signal configuration demand information of the terminal.

Further, the transceiver 3010 is specifically configured to send the positioning signal configuration reference information to the positioning server in the following manner: receiving, by using Long Term Evolution positioning protocol a LPPa signaling, the positioning signal configuration reference information sent by the serving base station.

Further, the transceiver 3010 is specifically configured to receive, by using the LPPa signaling in the following manner, the positioning signal configuration reference information sent by the serving base station:

receiving, by using assistance data feedback signaling, the positioning signal configuration reference information sent by the serving base station.

Further, the positioning signal configuration demand information received by the transceiver 3010 is a current demand indication of multicarrier positioning signals of the terminal and/or a current demand indication of multi-radio access technology positioning signals of the terminal.

Further, the positioning signal sending entity may be a serving base station; and the processor 3030 is specifically configured to obtain the positioning signal configuration information in the following manner:

receiving, by using the transceiver 3010, positioning signal configuration request information sent by the positioning server, and determining the positioning signal configuration information according to the positioning signal configuration request information, where the positioning signal configuration request information includes positioning signal configuration reference information and/or expected configuration information, the expected configuration information is determined by the positioning server according to the positioning signal configuration reference information, and the positioning signal configuration reference information is sent by the serving base station, the terminal, or a mobility management entity of the terminal to the positioning server; and determining the positioning signal configuration information according to the obtained positioning signal configuration reference information.

Further, the processor 3030 is further configured to invoke the program code stored in the memory 3020 to perform the following operations: after obtaining the positioning signal configuration information, sending the positioning signal configuration information to the positioning server by using the transceiver 3010, so that the positioning server sends the positioning signal configuration information to a positioning base station except the serving base station.

Further, the positioning signal configuration information obtained by the processor 3030 includes: information of multiple carriers corresponding to multiple positioning signals, and/or information of multiple radio access technologies corresponding to multiple positioning signals.

Figure 31:
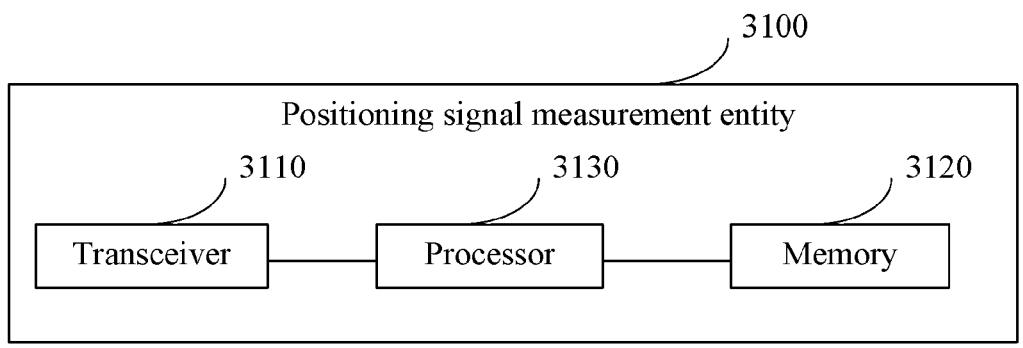
FIG. 31 is a schematic structural diagram of a positioning signal measurement entity according to another embodiment of the present invention.

Referring to FIG. 31, FIG. 31 is a schematic structural diagram of a positioning signal measurement entity 3100 according to an embodiment of the present invention. As shown in the figure, the positioning signal measurement entity 3100 includes a transceiver 3110, a memory 3120, and a processor 3130 coupled with the transceiver 3110 and the memory 3120. Certainly, the positioning signal measurement entity 3100 may further include a universal component such as a baseband processing component, an intermediate radio frequency processing component, or an input/output apparatus, which is not limited in the embodiment of the present invention.

The memory 3120 is configured to store a set of program code; and the processor 3130 is coupled with the memory 3120, and invokes the program code stored in the memory 3120 to perform the following operations:

receiving, by using the transceiver 3110, positioning signal configuration information sent by a positioning server;

receiving positioning signals by using the transceiver 3110 according to the positioning signal configuration information, and measuring the positioning signals to obtain multiple measurement results of the positioning signals between the positioning signal measurement entity and a positioning signal sending entity; and sending, by using the transceiver 3110, multiple measurement estimation results corresponding to the multiple measurement results to the positioning server, so that the positioning server determines a shortest transmission path between the positioning signal measurement entity and the positioning signal sending entity according to the multiple measurement estimation results, and positions a terminal by using a measurement estimation result corresponding to the shortest transmission path in the multiple measurement estimation results; or determining a measurement estimation result of a shortest transmission path between the positioning signal measurement entity and the positioning signal sending entity in multiple measurement estimation results corresponding to the multiple measurement results, and sending the measurement estimation result corresponding to the shortest transmission path to the positioning server, so that the positioning server positions a terminal by using the measurement estimation result of the shortest transmission path, where the terminal is one of the positioning signal measurement entity and the positioning signal sending entity, and the measurement estimation result is the measurement result or an estimation result derived according to the measurement result.

This embodiment is an apparatus embodiment corresponding to the foregoing method embodiment, the effects thereof are the same as those in the foregoing method embodiment, and for details, reference may be made to the foregoing descriptions, which is not described herein again. In addition, for specific steps performed by each module, reference may be made to the descriptions in the foregoing method embodiment.

Further, the processor 3130 is further configured to: before receiving, by using the transceiver 3110, the positioning signal configuration information sent by the positioning server, send positioning signal configuration reference information to the positioning server by using the transceiver 3110, so that the positioning server determines the positioning signal configuration information according to the positioning signal configuration reference information, where the positioning signal configuration reference information includes one or more of the following: environment information, radio channel propagation information, and positioning signal configuration demand information of the terminal.

Further, the positioning signal measurement entity may be the terminal; and the transceiver 3110 is specifically configured to send the positioning signal configuration reference information to the positioning server in the following manner: sending the positioning signal configuration reference information to the positioning server by using Long Term Evolution positioning protocol LPP signaling.

Further, the transceiver 3110 is specifically configured to send the positioning signal configuration reference information to the positioning server by using the LPP signaling in the following manner:

sending the positioning signal configuration reference information to the positioning server by using assistance data request signaling; or sending the positioning signal configuration reference information to the positioning server by using terminal positioning capability signaling.

Further, the processor 3130 is specifically configured to measure, in the following manner, the positioning signals to obtain the multiple measurement results of the positioning signals between the positioning signal measurement entity and the positioning signal sending entity: separately measuring the multiple positioning signals sent by one positioning signal sending entity, to obtain the measurement results corresponding to the multiple positioning signals.

Further, the processor 3130 is specifically configured to measure, in the following manner, the positioning signals to obtain the multiple measurement results of the positioning signals between the positioning signal measurement entity and the positioning signal sending entity: obtaining at least two measurement results of one positioning signal after measuring the one positioning signal by using at least two measurement manners.

Figure 32:
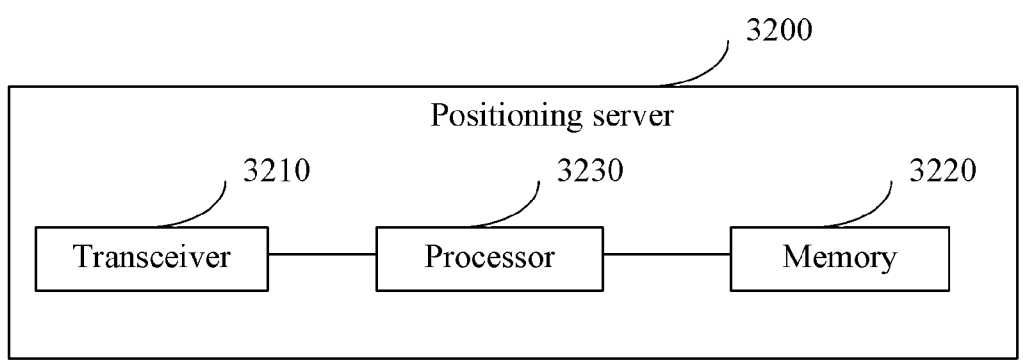
FIG. 32 is a schematic structural diagram of a positioning server according to another embodiment of the present invention.

Referring to FIG. 32, FIG. 32 is a schematic structural diagram of a positioning server 3200 according to an embodiment of the present invention. As shown in the figure, the positioning server 3200 includes a transceiver 3210, a memory 3220, and a processor 3230 coupled with the transceiver 3210 and the memory 3220. Certainly, the positioning server 3200 may further include a universal component such as a baseband processing component, an intermediate radio frequency processing component, or an input/output apparatus, which is not limited in the embodiment of the present invention.

The memory 3220 is configured to store a set of program code; and the processor 3230 is coupled with the memory 3220, and invokes the program code stored in the memory 3220 to perform the following operations:

receiving, by using the transceiver 3210, positioning signal configuration reference information sent by a terminal, a serving base station of the terminal, or a mobility management device to which the terminal belongs, where the positioning signal configuration reference information includes one or more of the following: environment information, radio channel propagation information, and positioning signal configuration demand information of the terminal;

determining positioning signal configuration information according to the positioning signal configuration reference information, where the positioning signal configuration information includes transmit power configuration information and/or resource configuration information of a positioning signal, and the resource configuration information includes time domain and/or frequency domain resource configuration information;

sending the positioning signal configuration information to a positioning signal sending entity by using the transceiver 3210, so that the positioning signal sending entity sends a positioning signal according to the positioning signal configuration information, where the positioning signal is a positioning signal with positioning signal transmit power increased and/or resources added according to the positioning signal configuration information, and the resources include time domain and/or frequency domain resources; and obtaining, by using the transceiver 3210, a measurement estimation result of the positioning signal that is reported by a positioning signal measurement entity, and positioning the terminal by using the measurement estimation result, where the terminal is one of the positioning signal measurement entity and the positioning signal sending entity.

This embodiment is an apparatus embodiment corresponding to the foregoing method embodiment, the effects thereof are the same as those in the foregoing method embodiment, and for details, reference may be made to the foregoing descriptions, which is not described herein again. In addition, for specific steps performed by each module, reference may be made to the descriptions in the foregoing method embodiment.

Further, the transceiver 3210 is specifically configured to receive, in the following manner, the positioning signal configuration reference information sent by the terminal: receiving, by using Long Term Evolution positioning protocol LPP signaling, the positioning signal configuration reference information sent by the terminal.

Further, the transceiver 3210 is specifically configured to receive, by using the LPP signaling in the following manner, the positioning signal configuration reference information sent by the terminal:

receiving, by using assistance data request signaling, the positioning signal configuration reference information sent by the terminal; or receiving, by using terminal positioning capability signaling, the positioning signal configuration reference information sent by the terminal.

Figure 33:
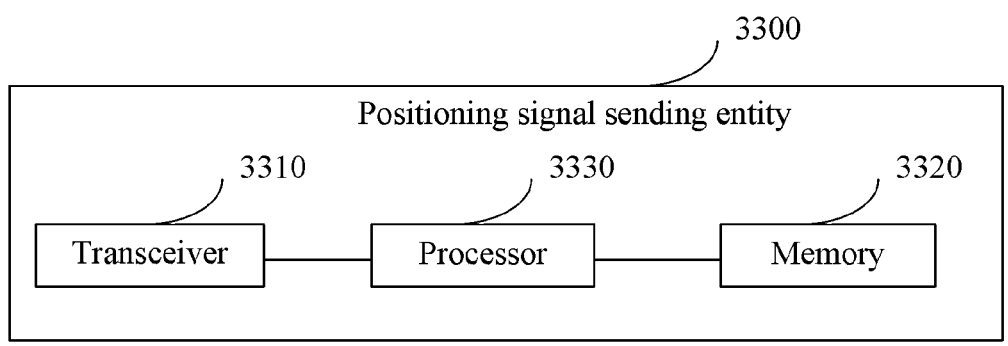
FIG. 33 is a schematic structural diagram of a positioning signal sending entity according to another embodiment of the present invention.

Referring to FIG. 33, FIG. 33 is a schematic structural diagram of a positioning signal sending entity 3300 according to an embodiment of the present invention. As shown in the figure, the positioning signal sending entity 3300 includes a transceiver 3310, a memory 3320, and a processor 3330 coupled with the transceiver 3310 and the memory 3320. Certainly, the positioning signal sending entity 3300 may further include a universal component such as a baseband processing component, an intermediate radio frequency processing component, or an input/output apparatus, which is not limited in the embodiment of the present invention.

The memory 3320 is configured to store a set of program code; and the processor 3330 is coupled with the memory 3320, and invokes the program code stored in the memory 3320 to perform the following operations:

receiving the positioning signal configuration information by using the transceiver 3310, where the positioning signal configuration information includes transmit power configuration information and/or resource configuration information of a positioning signal, and the resource configuration information includes time domain and/or frequency domain resource configuration information; and sending a positioning signal by using the transceiver 3310 according to the positioning signal configuration information, so that the positioning signal measurement entity measures the positioning signal and reports a measurement estimation result to a positioning server, and further, the positioning server positions a terminal according to the measurement estimation result, where the positioning signal is a positioning signal with positioning signal transmit power increased and/or resources added according to the positioning signal configuration information, and the resources include time domain and/or frequency domain resources.

This embodiment is an apparatus embodiment corresponding to the foregoing method embodiment, the effects thereof are the same as those in the foregoing method embodiment, and for details, reference may be made to the foregoing descriptions, which will not be described herein again. In addition, for specific steps performed by each module, reference may be made to the descriptions in the foregoing method embodiment.

Further, the processor 3330 is further configured to send positioning signal configuration reference information to the positioning server by using the transceiver 3310, so that the positioning server determines the positioning signal configuration information according to the positioning signal configuration reference information, where the positioning signal configuration reference information includes one or more of the following: environment information, radio channel propagation information, and positioning signal configuration demand information of the terminal.

Further, the positioning signal sending entity is the terminal; and the transceiver 3310 is specifically configured to send the positioning signal configuration reference information to the positioning server in the following manner:

sending the positioning signal configuration reference information to the positioning server by using Long Term Evolution positioning protocol LPP signaling.

Further, the transceiver 3310 is specifically configured to send the positioning signal configuration reference information to the positioning server by using the LPP signaling in the following manner:

sending the positioning signal configuration reference information to the positioning server by using assistance data request signaling; or sending the positioning signal configuration reference information to the positioning server by using terminal positioning capability signaling.

It should be noted that, the modules of the foregoing terminal perform information exchange, process execution, and the like in a method in another embodiment of the present invention, and for details, reference may be made to the descriptions in the method embodiments. In addition, the embodiment of the user equipment and the foregoing method embodiments are based on a same idea, and produces the same technical effects as those in the method embodiments of the present invention, and for specific content, reference may be made to the descriptions in the method embodiments of the present invention, and the details are not described herein again.

It should be noted that, in the foregoing embodiments of the user equipment and the base station, a division of the functional modules is only an example for description, and in an actual application, the foregoing functions may be accomplished by different functional modules as required, for example, in consideration of a configuration requirement of corresponding hardware or convenience of software implementation, that is, the internal structures of the user equipment and the base station are divided into different functional modules, so as to accomplish all or a part of the functions in the foregoing descriptions. In addition, in an actual application, corresponding functional modules in this embodiment may be implemented by corresponding hardware, or may be completed by corresponding hardware by executing corresponding software, for example, the sending module may be hardware capable of executing a function of the sending module, for example, a transmitter, or may be a general processor or another hardware device that can execute a corresponding computer program to accomplish the foregoing function; for another example, the processing module may be hardware capable of executing a function of the processing module, for example, a processor, or may be another hardware device that can perform a corresponding computer program to accomplish the foregoing function; and for still another example, the receiving module may be hardware capable of executing a function of the receiving module, for example, a receiver, or may be a general processor or another hardware device that can execute a corresponding computer program to accomplish the foregoing function (the foregoing described principles can apply to the embodiments provided in the specification).

A person of ordinary skill in the art may understand that all or a part of the steps of the methods in the embodiments may be implemented by a program instructing relevant hardware. The program may be stored in a computer readable storage medium. The storage medium may include: a read-only memory (ROM), a random access memory (RAM), a magnetic disk, or an optical disc.

The method, the user equipment, and the base stations that are provided by the embodiments of the present invention are described in detail above. The principle and the implementation manners of the present invention are described herein by using specific examples. The descriptions of the foregoing embodiments are provided for ease of understanding of the method and core ideas of the present invention. A person of ordinary skill in the art may make variations and modifications to the present invention in terms of the specific implementation manners and application scopes according to the ideas of the present invention. To sum up, the content of the specification shall not be construed as a limit to the present invention.

What is claimed is:

1. A positioning method, wherein the method comprises:
   determining, by a positioning server having a transceiver, positioning signal configuration information;
   sending, by the transceiver of the positioning server, the positioning signal configuration information to a positioning signal sending entity;
   obtaining, by the positioning server, a measurement estimation result of a shortest transmission path among a plurality of transmission paths between a positioning signal measurement entity and the positioning signal sending entity by comparing a first path of the plurality of transmission paths to a second path of the plurality of transmission paths; and
   positioning, by the positioning server, one of the positioning signal measurement entity and the positioning signal sending entity by using the measurement estimation result of the shortest transmission path, wherein one of the positioning signal measurement entity and the positioning signal sending entity is a terminal.

2. The method according to claim 1, wherein
   the determining, by a positioning server, positioning signal configuration information comprises: determining, by the positioning server, the positioning signal configuration information according to preconfigured positioning signal configuration reference information;
   or
   before the determining, by a positioning server, positioning signal configuration information, the method further comprises: receiving, by the positioning server, positioning signal configuration reference information sent by the terminal, a serving base station of the terminal, or a mobility management device to which the terminal belongs; and the determining, by a positioning server, positioning signal configuration information comprises: determining, by the positioning server, the positioning signal configuration information according to the positioning signal configuration reference information,
   wherein the positioning signal configuration reference information comprises one or more of the following: environment information, radio channel propagation information, and positioning signal configuration demand information of the terminal.

3. The method according to claim 2, wherein
   the positioning signal configuration demand information of the terminal is a current demand indication of multicarrier positioning signals of the terminal and/or a current demand indication of multi-radio access technology positioning signals of the terminal.

4. The method according to claim 1, wherein
   the terminal is the positioning signal measurement entity, and the positioning signal sending entity is a positioning base station.

5. The method according to claim 2, wherein
   the determining, by a positioning server, positioning signal configuration information comprises:
   sending, by the positioning server, positioning signal configuration request information to the serving base station of the terminal, wherein the positioning signal configuration request information comprises the positioning signal configuration reference information and/or expected configuration information, and the expected configuration information is expected positioning signal configuration information that is determined by the positioning server according to the positioning signal configuration reference information; and
   receiving the positioning signal configuration information that is determined by the serving base station according to the positioning signal configuration request information.

6. The method according to claim 2, wherein
   the receiving, by the positioning server, positioning signal configuration reference information sent by the terminal comprises: receiving, by the positioning server by using Long Term Evolution positioning protocol (LPP) signaling, the positioning signal configuration reference information sent by the terminal.

7. The method according to claim 6, wherein
   the receiving, by the positioning server by using LPP signaling, the positioning signal configuration reference information sent by the terminal comprises:
   receiving, by the positioning server by using assistance data request signaling, the positioning signal configuration reference information sent by the terminal; or
   receiving, by the positioning server by using terminal positioning capability signaling, the positioning signal configuration reference information sent by the terminal.

8. The method according to claim 2, wherein
   the receiving, by the positioning server, positioning signal configuration reference information sent by a serving base station of the terminal comprises: receiving, by the positioning server by using Long Term Evolution positioning protocol a (LPPa) signaling, the positioning signal configuration reference information sent by the serving base station.

9. The method according to claim 8, wherein
   the receiving, by the positioning server by using LPPa signaling, the positioning signal configuration reference information sent by the serving base station comprises:
   receiving, by the positioning server by using assistance data feedback signaling, the positioning signal configuration reference information sent by the serving base station.

10. The method according to claim 2, wherein
    the sending, by the positioning server, the positioning signal configuration information to a positioning signal sending entity comprises: sending, by the positioning server, the positioning signal configuration information to the positioning base station according to the positioning signal configuration reference information, wherein the positioning signal configuration information comprises: information of multiple carriers corresponding to multiple positioning signals, and/or information of multiple radio access technologies corresponding to multiple positioning signals.

11. A positioning server, wherein the positioning server comprises a memory, a transceiver, and a processor, wherein
the memory is configured to store program code; and
the processor is coupled with the memory, and is configured to invoke the program code stored in the memory to perform the following operations:
determining positioning signal configuration information;
controlling the transceiver to send the positioning signal configuration information to a positioning signal sending entity;
obtaining a measurement estimation result of a shortest transmission path among a plurality of transmission paths between a positioning signal measurement entity and the positioning signal sending entity by comparing a first path of the plurality of transmission paths to a second path of the plurality of transmission paths; and
positioning one of the positioning signal measurement entity and the positioning signal sending entity by using the measurement estimation result of the shortest transmission path, wherein one of the positioning signal measurement entity and the positioning signal sending entity is a terminal.

12. The positioning server according to claim 11, wherein the processor is configured to determine the positioning signal configuration information in the following manner: determining the positioning signal configuration information according to preconfigured positioning signal configuration reference information; and the memory is further configured to store the preconfigured positioning signal configuration reference information; or
the processor is configured to determine the positioning signal configuration information in the following manner: determining the positioning signal configuration information according to positioning signal configuration reference information received by the transceiver, wherein the positioning signal configuration reference information is sent by the terminal, a serving base station of the terminal, or a mobility management device to which the terminal belongs,
wherein the positioning signal configuration reference information comprises one or more of the following: environment information, radio channel propagation information, and positioning signal configuration demand information of the terminal.

13. The positioning server according to claim 12, wherein in the positioning signal configuration reference information received by the transceiver, positioning signal configuration demand information of the terminal is a current demand indication of multicarrier positioning signals of the terminal and/or a current demand indication of multi-radio access technology positioning signals of the terminal.

14. The positioning server according to claim 12, wherein the processor is configured to obtain the measurement result of the shortest transmission path between the positioning signal measurement entity and the positioning signal sending entity in the following manner:
controlling the transceiver to send positioning signal configuration request information to the serving base station of the terminal, wherein the positioning signal configuration request information comprises the positioning signal configuration reference information and/or expected configuration information, and the expected configuration information is expected positioning signal configuration information that is determined by the positioning server according to the positioning signal configuration reference information; and
receiving, by using the transceiver, the positioning signal configuration information that is determined by the serving base station according to the positioning signal configuration request information.

15. The positioning server according to claim 12, wherein the transceiver is specifically configured to receive, in the following manner, the positioning signal configuration reference information sent by the terminal: receiving, by using Long Term Evolution positioning protocol LPP signaling, the positioning signal configuration reference information sent by the terminal.

16. The positioning server according to claim 15, wherein the transceiver is configured to receive, by using the LPP signaling in the following manner, the positioning signal configuration reference information sent by the terminal:
receiving, by using assistance data request signaling, the positioning signal configuration reference information sent by the terminal; or
receiving, by using terminal positioning capability signaling, the positioning signal configuration reference information sent by the terminal.

17. The positioning server according to claim 12, wherein the transceiver is specifically configured to receive, in the following manner, the positioning signal configuration reference information sent by the serving base station: receiving, by using Long Term Evolution positioning protocol a LPPa signaling, the positioning signal configuration reference information sent by the serving base station.

18. The positioning server according to claim 17, wherein the transceiver is specifically configured to receive, by using the LPPa signaling in the following manner, the positioning signal configuration reference information sent by the serving base station:
receiving, by using assistance data feedback signaling, the positioning signal configuration reference information sent by the serving base station.

19. The positioning server according to claim 12, wherein the positioning signal configuration information determined by the processor comprises: information of multiple carriers corresponding to multiple positioning signals, and/or information of multiple radio access technologies corresponding to multiple positioning signals.

20. The positioning server according to claim 19, wherein the processor is specifically configured to obtain the measurement estimation result of the shortest transmission path between the positioning signal measurement entity and the positioning signal sending entity in the following manner:
receiving, by using the transceiver, measurement estimation results that are obtained after the positioning signal measurement entity separately measures the multiple positioning signals, determining a positioning signal that has the shortest transmission path in the multiple positioning signals according to the measurement estimation results of the multiple positioning signals, and obtaining the measurement estimation result of the shortest transmission path; or
receiving, by using the transceiver, the measurement estimation result of the shortest transmission path that is sent by the positioning signal measurement entity, wherein the measurement estimation result of the shortest transmission path is determined, after the positioning signal measurement entity separately measures the multiple positioning signals, by the positioning signal measurement entity according to measurement estimation results of the multiple positioning signals.

* * * * *